US012709551B2

(12) United States Patent
Yang et al.

(10) Patent No.: US 12,709,551 B2
(45) Date of Patent: Aug. 18, 2026

(54) METHOD FOR PREPARING NICKEL-RICH HYDROXIDE PRECURSOR MATERIAL AND METHOD FOR PREPARING NICKEL-RICH OXIDE CATHODE MATERIAL

(71) Applicant: MING CHI UNIVERSITY OF TECHNOLOGY, New Taipei City (TW)

(72) Inventors: Chun-Chen Yang, New Taipei City (TW); Yi-Shiuan Wu, New Taipei City (TW); Juliya Jeyakumar, New Taipei City (TW); Manojkumar Seenivasan, New Taipei City (TW); Hui-Chi Liu, Taipei City (TW); Ruey-Yu Wang, Taipei City (TW)

(73) Assignee: MING CHI UNIVERSITY OF TECHNOLOGY

( * ) Notice: Subject to any disclaimer, the term of this patent is extended or adjusted under 35 U.S.C. 154(b) by 211 days.

(21) Appl. No.: 18/627,174

(22) Filed: Apr. 4, 2024

(65) Prior Publication Data

US 2025/0230059 A1 Jul. 17, 2025

(51) Int. Cl.
*C01G 53/42* (2025.01)
*C01G 53/40* (2025.01)
(Continued)

(52) U.S. Cl.
CPC ............ *C01G 53/42* (2013.01); *C01G 53/40* (2013.01); *H01B 1/06* (2013.01); *H01M 4/525* (2013.01);
(Continued)

(58) Field of Classification Search
CPC .. H01B 1/00; H01B 1/06; H01B 1/08; H01M 4/04; H01M 4/525; C01G 53/40; C01G 53/42
See application file for complete search history.

(56) References Cited

U.S. PATENT DOCUMENTS

| | | | | |
|---|---|---|---|---|
| 11,444,281 B2 * | 9/2022 | Yun | ...................... | H01M 4/366 |
| 2023/0317926 A1 * | 10/2023 | Wu | ...................... | H01M 4/485 429/223 |

(Continued)

OTHER PUBLICATIONS

Schmuch et al "Production of Nickel-Rich Layered Cathode Materials for High-Energy Lithium Ion Batteries via a Couette-Taylor-Flow-Reactor", Material Matters, vol. 15, No. 2, 2020 (11 pages).*

(Continued)

*Primary Examiner* — Mark Kopec
(74) *Attorney, Agent, or Firm* — Leydig, Voit & Mayer, Ltd.

(57) ABSTRACT

The present disclosure provides the methods for preparing nickel-rich hydroxide precursor material and nickel-rich oxide cathode material having a homogeneous structure with an element concentration-gradient distribution by utilizing a continuous Taylor-flow reactor, comprising: (1) preparing an aqueous solution A with metal ion raw materials dissolved therein, an aqueous solution B with a manganese source dissolved therein, an aqueous solution C with a precipitant dissolved therein, and an aqueous solution D with a chelating agent dissolved therein; feeding the aqueous solution A, the aqueous solution C and the aqueous solution D into the continuous Taylor-flow reactor to perform a first co-precipitation reaction; (2) feeding the aqueous solution B into the continuous Taylor-flow reactor to perform a second co-precipitation reaction; (3) washing the precipitate obtained from the second co-precipitation reaction and putting the precipitate into an oven to dry the precipitate to fabricate the nickel-rich hydroxide precursor material. The nickel-rich hydroxide precursor material prepared with the method of the present disclosure exhibiting an element gradient distribution with the nickel-rich inner layer and the manganese-rich outer layer may reduce the diffusion impedance of the lithium ions and increase their migration paths, and the
(Continued)

nickel-rich oxide cathode material prepared from the nickel-rich hydroxide precursor material may increase the electrochemical performances and mechanical stability of the lithium-ion cells, such as charging and discharging rate, long-term cycle life, etc.

10 Claims, 29 Drawing Sheets

(51) Int. Cl.
*H01B 1/06* (2006.01)
*H01M 4/525* (2010.01)
*H01M 4/02* (2006.01)

(52) U.S. Cl.
CPC ...... *C01P 2002/52* (2013.01); *C01P 2002/72* (2013.01); *C01P 2002/85* (2013.01); *C01P 2004/03* (2013.01); *C01P 2004/04* (2013.01); *C01P 2004/53* (2013.01); *C01P 2006/40* (2013.01); *H01M 2004/028* (2013.01)

(56) References Cited

U.S. PATENT DOCUMENTS

2024/0166533 A1* 5/2024 Xu ........................ H01M 4/366
2024/0363850 A1* 10/2024 Sun ..................... H01M 4/0459

OTHER PUBLICATIONS

Babulal et al "Enhanced performance of a Ni-rich LiNi0.8Co0.1Mn0.1O2 cathode material formed through Taylor flow synthesis and surface modification with Li2MoO4", Chemical Engineering Journal 413 (2021) 127150.*

Seenivasan et al "Using a CouetteeTaylor vortex flow reactor to prepare a uniform and highly stable Li[Ni0$80Co0$15Al0.05]O2 cathode material", Journal of Alloys and Compounds 857 (2021) 157594.*

* cited by examiner

Yobs
Ycal
Diff
NCMA(hkl)
Intensity (a.u.)
10 20 30 40 50 60 70
2θ(degrees)

UC-NCMA
(003)
(101) (006/012)
(104)
Al foil
(107)
(018/110)
Relative Intensity
20
30
40
50
60
70
2 theta (deg.)

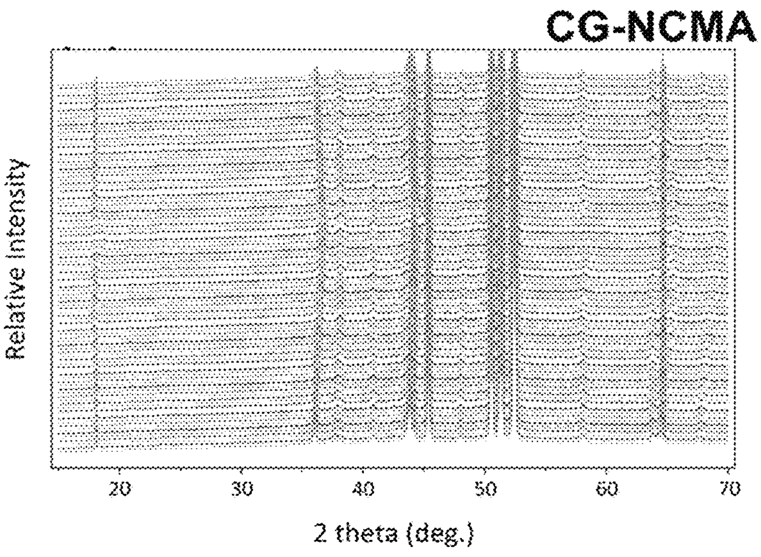
FIG. 15B
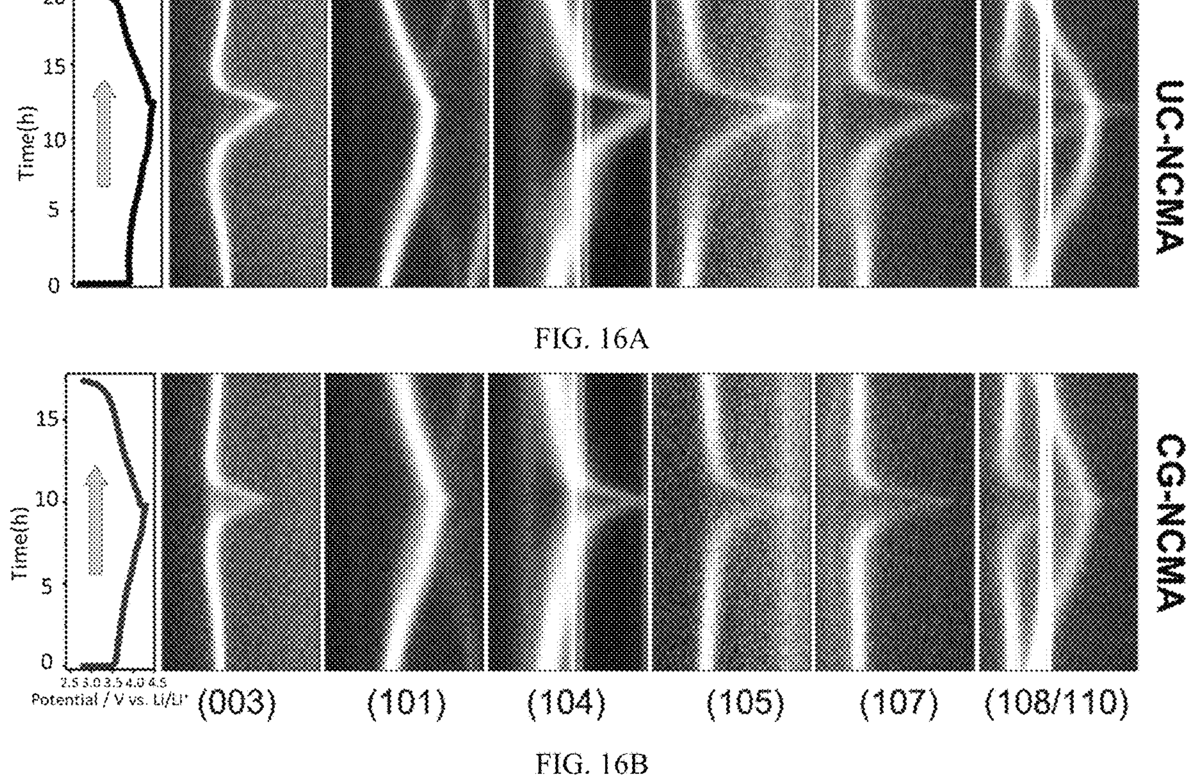
FIG. 16A
FIG. 16B

METHOD FOR PREPARING NICKEL-RICH HYDROXIDE PRECURSOR MATERIAL AND METHOD FOR PREPARING NICKEL-RICH OXIDE CATHODE MATERIAL

CROSS-REFERENCE TO RELATED APPLICATIONS

This application claims the benefit of priority of Taiwan Application Number TW113101723, filed on 16 Jan. 2024, which is herein incorporated by reference in its entirety.

TECHNICAL FILED

The present disclosure provides methods for preparing nickel-rich hydroxide precursor material and nickel-rich oxide cathode material, which especially relates to methods for preparing nickel-rich hydroxide precursor material and nickel-rich oxide cathode material having a homogeneous structure with an element concentration-gradient distribution by co-precipitation reaction with a continuous Taylor-flow reactor and ball-mill mixing.

BACKGROUND

As consumers' demand for energy for, for example, hybrid electric vehicles, smart grids, and power stations, is rapidly increasing, lithium-ion battery (LIB) is being extensively explored as a promising energy storage technology and appears to be the most optimized energy storage solution for tackling the energy crisis. Although LIBs are the preferred type of battery for most consumer electronics, their available oxide cathodes may have problems including poor mechanical properties, requiring high specific capacity, undesirable long-term cycle life and so on. Therefore, the research continues for next-generation oxide cathode materials, focused mostly on the improvement of mechanical strength of materials during charging and discharging, and the cycle life, specific capacity and safety of LIBs.

To fulfill the demand of technology development, nickel-rich layered oxide cathodes are highly promising cathode materials with a theoretical specific capacity of up to about 275 mAh/g, a high working voltage range of 2.8 to 4.3 V (vs. $Li/Li^+$). Compared with today's widely used lithium cobalt oxide cathode materials ($LiCoO_2$), these nickel-rich oxide cathodes are attractive because of their less toxicity and lower cost. Nevertheless, excessive Ni concentrations may lead to accelerated capacity degradation of LIBs, especially at high temperatures and high operating voltages, thereby posing serious safety risks as a result of structural and chemical instability. When nickel-rich oxide cathodes are charged to high voltage, unstable $Ni^{4+}$ ions develop, leading to the formation of a NiO-type impure phase and release of reactive oxygen ($O_2$)-containing species. These extremely reactive $Ni^{4+}$ ions may also hasten the breakdown of the electrolyte, leading to depletion of the electrolyte and loss of cyclability of the LIBs. In addition, the electrochemically inactive NiO-type impure phase may increase the lithium (Li)-ion diffusion impedance, further decreasing the rate capability of LIBs. Meanwhile, the $O_2$ released by oxygen-containing species would react with the organic electrolyte, leading to thermal runway of the LIBs.

Cation mixing, i.e., a process in which $Li^+$ ions (with an ion radius of about 0.76 Å) and $Ni^{2+}$ ions (with an ion radius of about 0.69 Å) exchange their respective sites in layers, is the primary cause of deterioration in the capacity loss and phase change of nickel-rich oxide cathodes. This ion exchange is made by their similar ion radii. In addition, unwanted side reactions of nickel-rich oxide with air or moisture may result in the generation of undesired surface residue species (such as LiOH and $Li_2CO_3$) that can interact with the electrolyte to produce an insulating surface layer, thereby resulting in overvoltage when charging the LIBs. For these reasons, it has been challenging to employ traditional nickel-rich oxide cathodes in commercial LIBs application of, for example, electric vehicles and smart grids.

Strategies to boost the structural stability of nickel-rich oxide cathodes and long-term cycle life of the LIBs include changing composition, adjusting manufacturing conditions, and surface modifications. In particular, a concentration-gradient structure, also known as a core-shell structure, in which an electrochemically active transition metal (TM) is constrained mostly at the core of the active material particles while an inactive TM acts as the shell, is used to increase the structural stability of the nickel-rich oxide cathode and the cyclability of the LIBs. In prior arts, it has been demonstrated that using a $Li[Ni_{0.8}Co_{0.2}]_x[Ni_{0.2}Mn_{0.8}]_{1-x}$ (1>x>0.5) oxide cathode material which has a high Mn content as the outer layer can minimize the side reactions on the surface, since the Mn species in this material has, on average, a tetravalent oxidation state which has great structural stability and preserves the hexagonal shape during cycling, even at elevated voltages.

SUMMARY

However, there is no prior art indicating an invention related to nickel-rich oxide cathode materials which have long-term cycling stability and can suppress side reactions effectively.

Accordingly, the present disclosure provides methods for preparing the nickel-rich hydroxide precursor material and further provides methods for synthesizing the quaternary oxide cathode material having a homogeneous structure with an element concentration-gradient distribution through the nickel-rich hydroxide precursor material. In the present disclosure, "nickel-rich" refers to the nickel content of more than 50% in molar ratio of the overall compound. The nickel-rich hydroxide precursor material of the present disclosure is nickel cobalt manganese hydroxide with a homogeneous structure, which is different from the core-shell structure in the prior arts where the core and the shell have different compositions, such as a core-shell structure with a binary material as a core and a ternary material as a shell. The element composition of the inner layer and the outer layer of the nickel-rich hydroxide precursor material of the present disclosure are identical. That is, each layer of the present disclosure has nickel, cobalt, and manganese, while the difference between each layer lies in the concentration ratio of each element.

The nickel-rich hydroxide precursor material prepared by the method of the present disclosure has a homogeneous element distribution structure with a nickel-rich inner layer and a manganese-rich outer layer, which may reduce the interfacial impedance of lithium ions transport and increase the migration path of lithium ions, thereby improving the electrochemical performance and cycling stability of the cathode in LIBs prepared therefrom. The nickel-rich oxide cathode material prepared by the method of the present disclosure has a homogeneous structure with an element concentration-gradient distribution as well, and has aluminum element as element for stabilizing structure, thereby improving the electrochemical performance of the LIBs such as the rate capability and the mechanical strength of the electrode materials.

The method for preparing the nickel-rich hydroxide precursor material of the present disclosure includes feeding an aqueous solution A containing nickel ions and cobalt ions, a precipitant (aqueous solution C) and a chelating agent (aqueous solution D) into a continuous Taylor-flow reactor (TFR) to perform a first co-precipitation reaction; feeding an aqueous solution B containing manganese ions into the TFR to perform a second co-precipitation reaction; and washing and drying the precipitate to obtain the nickel-rich hydroxide precursor material.

The method for preparing the nickel-rich oxide cathode material of the present disclosure includes mixing an ethanol solution containing aluminum ions with the nickel cobalt manganese hydroxide precursor; drying it; milling and mixing the dried mixture with an lithium source with a ball mill; and then performing a three-stage calcination to obtain the lithium nickel cobalt manganese aluminum oxide cathode material.

In particular, the present disclosure provides a method for preparing a nickel-rich hydroxide precursor material, which is a nickel cobalt manganese hydroxide having a homogeneous structure with an element concentration-gradient distribution, comprising:

(1) preparing an aqueous solution A with metal ion raw materials dissolved therein; preparing an aqueous solution B with a manganese source dissolved therein; preparing an aqueous solution C with a precipitant dissolved therein; preparing an aqueous solution D with a chelating agent dissolved therein; feeding the aqueous solution A, the aqueous solution C and the aqueous solution D into a continuous Taylor-flow reactor to perform a first co-precipitation reaction for 2 to 7 hours;
   - wherein the metal ion raw materials include a nickel source and a cobalt source;
   - wherein the nickel source is at least one selected from a group consisting of nickel sulfate, nickel oxalate, nickel acetate, nickel nitrate, nickel chloride, and nickel hydroxide;
   - the cobalt source is at least one selected from a group consisting of cobalt sulfate, cobalt oxalate, cobalt carbonate, cobalt acetate, cobalt nitrate, cobalt chloride, and cobalt hydroxide;
   - the manganese source is at least one selected from a group consisting of manganese sulfate, manganese oxalate, manganese carbonate, manganese citrate, manganese acetate, manganese nitrate, manganese phosphate, electrolytic manganese dioxide, and manganese oxide;

(2) feeding the aqueous solution B into the continuous Taylor-flow reactor to perform a second co-precipitation reaction for 5 to 70 hours to obtain a precipitate; wherein
   - the second co-precipitation reaction is performed with a reaction temperature of 30° C. to 80° C., an reaction pH value of 9.5 to 12.5, and a rotation speed of an inner cylinder in the continuous Taylor-flow reactor of 200 rpm to 1500 rpm;

(3) washing the precipitate obtained from the second co-precipitation reaction and putting the precipitate into an oven to dry the precipitate, to fabricate the nickel-rich hydroxide precursor material.

Further, the aqueous solution A may have a concentration of 1.6 M to 1.92 M.

Further, the aqueous solution B may have a concentration of 0.08 M to 0.4 M.

Further, the aqueous solution C may have a concentration of 2.0 M to 6.0 M, and a weight molar concentration ratio of the aqueous solution A and aqueous solution C may be 1:1 to 1:5.

Further, the aqueous solution D may have a concentration of 2.5 M to 9.0 M, and a weight molar concentration ratio of the aqueous solution A and aqueous solution D may be 1:1 to 1:5.

Further, the oven may be operated with a drying temperature of 60° C. to 120° C. and a drying time of 6 to 24 hours.

Further, the aqueous solution A and the aqueous solution B may be fed with a feed rate of 1.0 to 3.0 ml/min.

The present disclosure also provides a method for preparing a nickel-rich oxide cathode material, which has a homogeneous structure with an element concentration-gradient distribution, comprising the method for preparing the nickel-rich hydroxide precursor material described above and:

(a) dispersing an aluminum source in ethanol, adding and mixing the nickel-rich hydroxide precursor material with the aluminum source in the ethanol to obtain a blend, heating the blend at a temperature of 80° C. until the blend is totally dried to obtain a mixture A;
   - wherein the aluminum source is at least one selected from a group consisting of aluminum hydroxide, aluminum oxalate, aluminum carbonate, aluminum sulfate, aluminum acetate, aluminum nitrate, and aluminum phosphate;

(b) milling and mixing a lithium source, and a molar ratio of the mixture A and the lithium source is 1:1.01 to 1:1.25 to obtain a mixture B;
   - the lithium source is at least one selected from a group consisting of lithium hydroxide, lithium nitrate, lithium acetate, lithium chloride, lithium hydrogen phosphate, lithium phosphate, and lithium carbonate;

(c) performing a three-stage calcination to the mixture B to fabricate the nickel-rich oxide cathode material.

Further, the lithium source and the mixture A may be milled with a ball mill for 2 to 10 hours with a rotation speed of the ball milling being 50 to 200 rpm.

Further, the three-stage calcination may be performed at: a temperature of 100° C. to 200° C. for 1 to 3 hours at a first stage; a temperature of 500° C. to 600° C. for 4 to 8 hours at a second stage; and a temperature of 700° C. to 800° C. for 10 to 40 hours at a third stage, wherein the first stage, the second stage and the third stage are performed with a heating rate of 0.1 to 20° C./min.

The nickel-rich oxide cathode material having a homogeneous structure with an element concentration-gradient distribution prepared by the method of the present disclosure has the element concentration-gradient distribution of nickel-rich inner layer, manganese-rich outer layer, and aluminum-containing surface layer. This active material particle structure may help the cathode material to preserve the mechanical stability at high current rates and may also effectively suppress the side reactions between the cathode material and the electrolyte.

Accordingly, compared with conventional oxide cathode materials with uniform concentration, the LIBs composed of the nickel-rich oxide cathode material with an element concentration-gradient distribution prepared by a continuous Taylor-flow reactor exhibits more advantageous electrochemical performance, such as high charging and discharging current rates, high capacity retention after long-term cycling, and so on.

Also, in the method of the present disclosure, the nickel-rich hydroxide precursor prepared by performing co-precipitation reactions with a continuous Taylor-flow reactor has uniform distribution of particles having larger particle sizes on average with a narrower particle size distribution and exhibits needle-like primary particle morphology, and then the formed ordered secondary particle morphology has structures that can tolerate tensile/compression stress generated by long-term charging and discharging cycles, thereby preventing the formation of micro cracks and improving preparation efficiency in mass production.

In summary, the present disclosure provides methods for preparing the nickel-rich hydroxide precursor material and the nickel-rich oxide cathode material having homogeneous structures with element concentration-gradient distributions, which are suitable for mass production. The nickel-rich hydroxide precursor has uniform and stress resistant structure, and the nickel-rich oxide cathode material has excellent charging and discharging efficiency (i.e., Coulombic efficiency) and long-term cycling stability, which may enhance the electrochemical performance of the resulting LIBs.

BRIEF DESCRIPTION OF THE DRAWINGS

FIG. 14C and FIG. 14D represent changes in electrochemical impedance of the UC-NCMA/Li cells and the CG-NCMA/Li cells at 1 C/1 C before (FIG. 14C) and after 100 cycles (FIG. 14D).

FIG. 15A represents the in-situ XRD patterns of the UC-NCMA cathode during the charging/discharging cycles and FIG. 15B represents the in-situ XRD patterns of the CG-NCMA cathode during the charging/discharging cycles.

FIG. 16A and FIG. 16B represent the voltage-against-time contour plots of main peaks at 10-80° in the in-situ XRD patterns corresponding to the charging/discharging process for one cycle of the UC-NCMA cathode (FIG. 16A) and the CG-NCMA cathode (FIG. 16B); and FIG. 16C, FIG. 16D and FIG. 16E represent the changes in lattice parameters calculated based on the in-situ XRD patterns during the charging/discharging cycle, wherein FIG. 16C represents the a-axis of the crystal plane (101); FIG. 16D represents the c-axis of the crystal plane (003); and FIG. 16E represents the volume change of the lattice.

DETAILED DESCRIPTION

The methods for preparing a nickel-rich hydroxide precursor material and a nickel-rich oxide cathode material of the present disclosure are illustrated by the following exemplified embodiments. It is noted that the following exemplified embodiments are merely intended to describe the present disclosure, but not to limit the scope of the present disclosure.

Method for Preparing a Nickel-Rich Hydroxide Precursor Material

Figure 1:
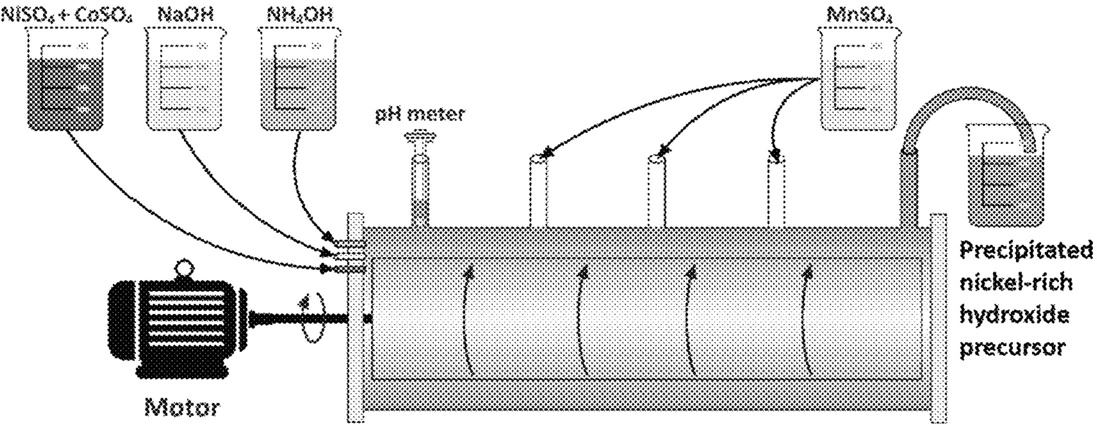
FIG. 1 represents the schematic diagram of synthesizing a nickel-rich hydroxide precursor with a concentration-gradient distribution utilizing a continuous Taylor-flow reactor.

First, a nickel-rich hydroxide precursor material with an element concentration-gradient distribution is fabricated by co-precipitation reactions with a continuous Taylor-flow reactor (TFR, 1 L, Laminar Korea). The schematic diagram is shown in FIG. 1.

Figure 2A:
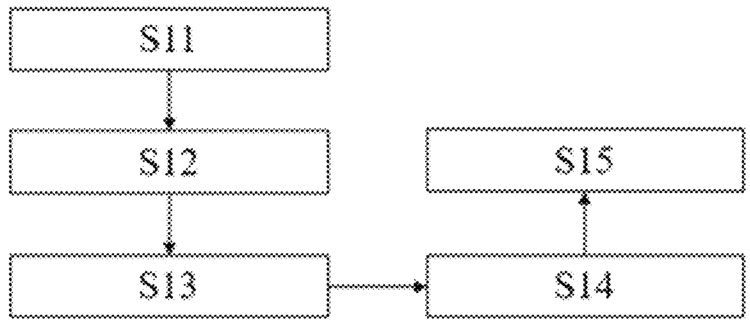
FIG. 2A and FIG. 2B represent the flow chart of the method for preparing (FIG. 2A) a nickel-rich hydroxide precursor and (FIG. 2B) nickel-rich oxide cathode material according to an embodiment of the present disclosure.

As shown in FIG. 2A, the steps of the method for preparing the nickel-rich hydroxide precursor material of the present disclosure include:

- S11: mixing the metal ion raw materials in deionized water to form a mixed solution of metal ions (aqueous solution A);
- S12: dissolving manganese source in deionized water to form aqueous solution B;
- S13: feeding the aqueous solution A, precipitant aqueous solution (aqueous solution C) and chelating agent aqueous solution (aqueous solution D) into a TFR filled with deionized water to perform the first co-precipitation reaction;
- S14: feeding the aqueous solution B into the TFR to perform the second co-precipitation reaction;
- S15: collecting the precipitate of the second co-precipitation reaction, washing the precipitate with ethanol and deionized water to remove the remaining ions, and then putting the washed precipitate into an oven to dry, to fabricate the nickel-rich hydroxide precursor material.

Specifically, the methods for preparing each solution are described below.

Preparation for the mixed solution of metal ions (aqueous solution A): dissolving and mixing the metal ion raw materials in deionized water to prepare a mixed solution of metal ions, i.e., aqueous solution A. In one embodiment, the metal ion raw materials include a nickel source and a cobalt source. In one embodiment, the nickel source is at least one selected from the group consisting of nickel sulfate, nickel oxalate, nickel acetate, nickel nitrate, nickel chloride, and nickel hydroxide; and the cobalt source is at least one selected from the group consisting of cobalt sulfate, cobalt oxalate, cobalt carbonate, cobalt acetate, cobalt nitrate, cobalt chloride, and cobalt hydroxide. In one embodiment, the concentration of aqueous solution A is 1.6 M to 1.92 M, preferably 1.7 M to 1.92 M, more preferably 1.8 M to 1.92 M, and even more preferably 1.92 M.

Preparation for aqueous solution B: dissolving a manganese source in deionized water to prepare the aqueous solution B. In one embodiment, the manganese source is at least one selected from the group consisting of manganese sulfate, manganese oxalate, manganese carbonate, manganese citrate, manganese acetate, manganese nitrate, manganese phosphate, electrolytic manganese dioxide, and manganese oxide (for example, $\alpha$-$MnO_2$, $\beta$-$MnO_2$, $\gamma$-$MnO_2$, $Mn_2O_3$, $Mn_3O_4$). In one embodiment, the concentration of aqueous solution B is 0.08 M to 0.4 M, preferably 0.08 M to 0.2 M, more preferably 0.08 M to 0.1 M, and even more preferably 0.08 M.

Preparation for the precipitant aqueous solution (aqueous solution C): dissolving and mixing a precipitant in deionized water to prepare the precipitant aqueous solution for the subsequent co-precipitation reactions. In one embodiment, the precipitant is sodium hydroxide. In one embodiment, the concentration of aqueous solution Cis 2.0 M to 6.0 M, preferably 2.5 M to 5.0 M, more preferably 3.0 M to 4.5 M, and even more preferably 4 M. In one embodiment, the weight molar concentration ratio of the aqueous solution A and the aqueous solution C is 1:1 to 1:5, preferably 1:1 to 1:4, more preferably 1:1 to 1:3, even more preferably 1:2.

Preparation for the chelating agent aqueous solution (aqueous solution D): dissolving and mixing a chelating agent in deionized water to prepare the chelating agent aqueous solution for the subsequent co-precipitation reactions. In one embodiment, the chelating agent is ammonium hydroxide. In one embodiment, the concentration of aqueous solution D is 2.5 M to 9.0 M, preferably 4.0 M to 9.0 M, more preferably 6.0 M to 8.0 M, and even more preferably 7.2 M. In one embodiment, the weight molar concentration ratio of the aqueous solution A and the aqueous solution D is 1:1 to 1:5, preferably 1:1 to 1:4, more preferably 1:1 to 1:3, and even more preferably 1:3.

In one embodiment, all of the aqueous solutions described above are filtered to remove unwanted impurities before performing the co-precipitation reactions.

The schematic diagram for preparing the nickel-rich hydroxide precursor with a TFR is shown in FIG. 1. When the inner cylinder in the TFR is rotating, the aqueous solution A, C, and D are fed into the front inlet of the cylindrical chamber of the TFR filled with deionized water. After the first co-precipitation reaction, the aqueous solution B is fed into the upper inlet of the TFR to undergo the second co-precipitation reaction with the mixture of the aqueous solution A, C, and D via the cylindrical chamber of the TFR. In one embodiment, the time for the first co-precipitation reaction is 2 to 7 hours, preferably 3 to 6 hours, more preferably 5 hours. In one embodiment, the time for the second co-precipitation reaction is 5 to 70 hours, preferably 15 to 55 hours, more preferably 20 to 30 hours. In one embodiment, the temperature for the second co-precipitation reaction is 30° C. to 80° C., preferably 45° C. to 70° C., more preferably 60° C., wherein the temperature of 60° C. allows the most complete co-precipitation reaction and results in spherical secondary particles composed of needle-like primary particles, thereby achieving the desirable ordered arrangement and compactness. The reaction pH value may be 9.5 to 12.5, preferably 10.0 to 12.0, more preferably 11.2. The reaction is held constant by controlling the flow rate of the aqueous solution C. A pH value of 11.2 can keep the co-precipitation reaction at steady state, thereby achieving the best particle size distribution. In one embodiment, the rotation speed of the inner cylinder in the TFR is 200 rpm to 1500 rpm, preferably 400 rpm to 1000 rpm, more preferably 500 rpm to 800 rpm, and even more preferably 600 rpm, wherein a rotation speed of 600 rpm is optimal for generating secondary particles with the particle size of about 8-12 μm, which is most preferable for polycrystalline cathode materials. The feeding rates of the aqueous solution A and aqueous solution B are 1.0 ml/min to 3.0 ml/min, preferably 1.5 ml/min to 2.0 ml/min, more preferably 1.703 ml/min, for a continuous production.

The present disclosure utilizes a TFR to prepare the hydroxide precursor. Compared with the batch reactor used in the conventional continuous stirred-tank reactor (CSTR), preparing by the TFR includes the following advantages:

Controllability and uniformity: TFRs can form various flow patterns by controlling the rotation speed of the inner cylinder in the reactor. In the embodiment of the present disclosure, it exhibits a fluid mixing pattern called Taylor flow, which is a micro-scale mixing that can make the environment of co-precipitation reactions suitable for preparing more homogeneous nickel-rich hydroxide precursors. In contrast, conventional batch reactors perform mixing by turbulent flow, which is a macro mixing, thereby probably leading to differences and changes in the particle size and material composition, especially impacting the material uniformity and the preparation efficiency in mass production.

Scalability: generally, laboratory scale of preparing nickel-rich hydroxide precursors may be amplified to industrial scale, i.e., the reactor capacity required is up to 1 L to 1000 L. Accordingly, the properties of TFRs which allow continuous operation and amplification ensure the consistent quality of mass production. In contrast, conventional batch reactors are for application of research and development with small scale. It is harder for the conventional batch reactors to keep consistent reaction conditions and quality of products.

Reaction time and preparation efficiency: in the process of preparing the nickel-rich hydroxide precursors, the properties of TFRs such as continuous production and micro-scale mixing can effectively reduce the preparation time, thereby improving production efficiency. In contrast, the conventional batch reactors with macro mixing needs longer reaction time, thereby reducing the efficiency in the process of continuous and mass production.

It is also noted that reaction parameters of the TFR, including the reaction temperature, the pH value, the rotation speed of the inner cylinder, and the feeding rate, have significant impact on the properties of the prepared nickel-rich hydroxide precursors. Therefore, setting and control for the conditions described above are important.

(1) Reaction temperature: reaction temperature has significant impact on the shape of the nickel-rich hydroxide precursor particles. Excessively low temperature results in incomplete formation of the secondary particles, while excessively high temperature results in undesired shapes of the primary particles.

(2) Rotation speed of the inner cylinder: the rotation speed of the inner cylinder in the TFR may directly influence the particle size of the precursors. Increasing the rotation speed would generate smaller vortex and thereby generate core particles with smaller particle size, resulting in a large amount of small-sized particles. The particles with too small size would easily exert adverse impacts on the electrochemical performance of the resulting cathode materials, because the particles with too small size (about ≤1 to 3 μm) would have larger surface area and higher solid electrolyte interphase (SEI) resistance. In contrast, the particles with too large size (about >20 to 30 μm) would result in poor overall electrochemical performance of the cathode material because their longer migration paths for lithium ions would slow the diffusion coefficient of the lithium ions. For the best electrochemical performance of the cathode material, the size of the active material particles prepared by the method of the present disclosure is preferably 8~12 μm.

(3) Feeding rate and pH value: when the feeding rate or pH value is too high, a large amount of hydroxide core particles would be generated, thereby leading to incomplete formation or loose structure of the secondary particles. This kind of particle tends to disintegrate and chalk during the following manufacturing process. On the other hand, when the process is performed at excessively low feeding rate, the retention time of the particles in the reaction chamber would be prolonged, thereby reducing the preparation efficiency. Excessively low pH value may also directly impact the shape of particles.

Accordingly, the reaction of the mixed solutions in the cylindrical chamber of the TFR is controlled under the aforementioned conditions. Then, precipitant of the co-precipitation reaction may be collected at the outlet of the TFR cylinder, washed with ethanol and deionized water to remove the remaining $Na^+$, $SO_4^{2-}$ ions, and then dried in an oven. In one embodiment, the temperature of the oven may be 60° C. to 120° C., preferably 60° C. to 100° C., more preferably 60° C. to 80° C., and even more preferably 60° C.; the drying time may be 6 to 24 hours, preferably 8 to 20 hours, more preferably 10 to 15 hours, and even more preferably 12 hours. After dried, nickel-rich hydroxide precursor $Ni_xCo_yMn_{1-x-y}(OH)_2$ with concentration gradient is obtained.

Method for Preparing Nickel-Rich Oxide Cathode Material

Figure 2B:
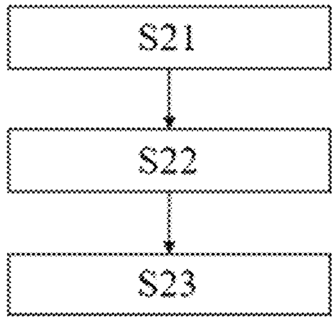

As shown in FIG. 2B, the steps of the method for preparing the nickel-rich oxide of the present disclosure include:

S21: dispersing an aluminum source in ethanol, adding the nickel-rich hydroxide precursor material in it and mixing them to obtain a blend; and then heating the blend until the blend is totally dried to obtain a mixture A;

S22: utilizing a ball mill with grinding balls for milling and mixing the mixture A of S21 with a lithium source to obtain a mixture B;

S23: performing a three-stage calcination to the mixture B of S22 in a furnace.

The aluminum source is dispersed in ethanol in an appropriate amount, thoroughly mixed with the added nickel-rich hydroxide precursor powder prepared by the aforementioned method, and then heated at a fixed temperature until it is totally dried to obtain a mixture A. In one embodiment, the aluminum source is $Al(OH)_3$. In one embodiment, the fixed temperature is 70° C. to 90° C., preferably 80° C.

Then, the lithium source is added into the mixture A. In one embodiment, the lithium source is $LiOH \cdot H_2O$ (i.e., lithium salt). In one embodiment, the molar ratio of the mixture A and the lithium source is 1:1.01 to 1:1.25, preferably 1:1.01 to 1:1.20, more preferably 1:1.01 to 1:1.10, and even more preferably 1:1.05.

Then, the mixture B is obtained by milling and mixing the lithium source and the mixture A with a ball mill utilizing PU balls or agate balls. The rotation speed of the ball milling is 50 rpm to 200 rpm, preferably 70 rpm to 150 rpm, more preferably 80 rpm to 125 rpm, and even more preferably 100 rpm; the grinding time is 2 to 10 hours, preferably 3 to 8 hours, more preferably 4 to 6 hours, and even more preferably 5 hours; the ratio of the PU balls or agate balls to the mixture A and the lithium source is 1:1 to 1:20, preferably 1:1 to 1:10, more preferably 1:1 to 1:5, and even more preferably 1:1.

Then, a three-stage calcination to the mixture B is performed with a furnace in air or pure oxygen atmosphere, preferably in pure oxygen atmosphere. For the first stage of the three-stage calcination, the temperature is 100° C. to 200° C., preferably 120° C. to 180° C., more preferably 140° C. to 160° C., and even more preferably 150° C., and the time is 1 to 3 hours, preferably 1.5 to 2.5 hours, more preferably 2 hours; for the second stage of the three-stage calcination, the temperature is 500° C. to 600° C., preferably 520° C. to 580° C., more preferably 540° C. to 560° C., and even more preferably 550° C., and the time is 4 to 8 hours, preferably 5 to 7 hours, more preferably 6 hours; for the third stage of the three-stage calcination, the temperature is 700° C. to 800° C., preferably 710° C. to 775° C., more preferably 720° C. to 750° C., and even more preferably 730° C., and the time is 10 to 40 hours, preferably 15 to 30 hours, more preferably 20 hours. The heating rate of the three-stage calcination is 0.1 to 20° C./min, preferably 0.5 to 10° C./min, more preferably 1 to 5° C./min, and even more preferably 2° C./min.

Accordingly, the nickel-rich oxide cathode material having a homogeneous structure with an element concentration-gradient distribution is obtained.

When the metal ion proportions of nickel, cobalt, manganese and aluminum are changed, the nickel-rich oxide cathode materials prepared in the present disclosure would exhibit significant different electrochemical performance. For example, when the nickel content is higher, the oxide cathode material would have higher specific capacity; while when the aluminum or manganese content is higher, the better material structural stability may be achieved.

In the following examples, nickel-rich hydroxide precursor materials and nickel-rich oxide cathode materials are synthesized by the aforementioned methods respectively, and are measured for their related material characteristics and assessed for their cell electrochemical performances.

Example 1: Nickel-Rich Hydroxide Precursor Material $[Ni_{0.91}Co_{0.05}Mn_{0.04}](OH)_2$ $NiSO_4 \cdot 6H_2O$ with a molar concentration of 1.82 M and $CoSO_4 \cdot 7H_2O$ with a molar concentration of 0.1 M as metal ion raw materials are dissolved in deionized water to form aqueous solution A. $MnSO_4 \cdot H_2O$ with a molar concentration of 0.08 M is dissolved in deionized water to form aqueous solution B. Furthermore, sodium hydroxide as a precipitant is dissolved in deionized water to prepare aqueous solution C with a molar concentration of 4 M. Ammonium hydroxide as a chelating agent is dissolved in deionized water to prepare aqueous solution D with a molar concentration of 7.2 M. Before the co-precipitation reaction, the previous aqueous solutions are filtered to remove unwanted impurities. The weight molar concentration ratio of the aqueous solution A and aqueous solution C is 1:2 and the weight molar concentration ratio of the aqueous solution A and aqueous solution D is 1:3.

The aqueous solutions A, C and D are added into a TFR to perform a first co-precipitation reaction for 5 hours, and then the aqueous solution B is added into the TFR to perform a second co-precipitation reaction between the aqueous solution B and the aqueous solution A for 25 hours. Also, in the second co-precipitation reaction, the reaction temperature is 60° C., the reaction pH value is 11.2, and the reaction is kept constant by controlling the flow rate of NaOH. The rotation speed of the inner cylinder in the TFR is 600 rpm and a continuous production is performed under the feeding rates of the aqueous solution A and B of 1.703 ml/min. The precipitate of the second co-precipitation reaction is collected at the outlet of the TFR cylinder, washed by ethanol and deionized water for several times to remove excess residual ions, and dried in an oven at a temperature of 60° C. for 12 hours, to obtain the $[Ni_{0.91}Co_{0.05}Mn_{0.04}](OH)_2$ hydroxide precursor with an element concentration-gradient distribution, referred to as CG-NCM precursor in this Example.

Example 2: Nickel-Rich Oxide Cathode Material $Li[Ni_{0.90}Co_{0.04}Mn_{0.03}Al_{0.03}]O_2$ 0.15 g $Al(OH)_3$ is dispersed in 20 ml ethanol, which is then added and thoroughly mixed with 5 g of CG-NCM precursor powders, followed by being heated at 80° C. until it is totally dried to obtain mixture A. Then, the mixture A and $LiOH \cdot H_2O$ with a molar ratio of 1:1.05 are milled and mixed with a ball mill at a rotation speed of 100 rpm for 5 hours. In this Example, PU balls or agate balls are used for the milling and mixing (the ratio of the samples to balls is 1:1) to obtain mixture B. Last, a three-stage calcination to the mixture B is performed in pure oxygen atmosphere, wherein for the first stage, the temperature is 150° C. and the time is 2 hours; for the second stage, the temperature is 550° C. and the time is 6 hours; and for the third stage, the temperature is 730° C. and the time is 20 hours, respectively, and the heating rate of the three-stage calcination is 2° C./min. $Li[Ni_{0.90}Co_{0.04}Mn_{0.03}Al_{0.03}]O_2$ having a homogeneous structure with an element concentration-gradient distribution, referred to as CG-NCMA oxide in this Example, is thereby obtained.

Comparative Example 1

To compare the efficiencies of two kinds of oxide cathode materials with different concentration distributions, a nickel-rich hydroxide precursor material with a uniform element concentration distribution is synthesized by basically the same preparation methods and parameters: Ni, Co, Mn, and Al metal ion raw materials are all dissolved in a single solution and fed directly into the TFR to perform a co-precipitation reaction, to prepare $Ni_{0.90}Co_{0.04}Mn_{0.03}Al_{0.03}(OH)_2$ precursor with a uniform concentration distribution, referred to as UC-NCMA precursor.

Comparative Example 2

Subsequently, a three-stage calcination is performed to the dried UC-NCMA precursor powders under the same conditions as previous described in Example 2, to fabricate $Li[Ni_{0.90}Co_{0.04}Mn_{0.03}Al_{0.03}]O_2$ oxide cathode material with a uniform concentration distribution, referred to as UC-NCMA oxide.

The Examples and Comparative Examples are compared in the following analysis.

Crystallinity Analysis

Figure 3:
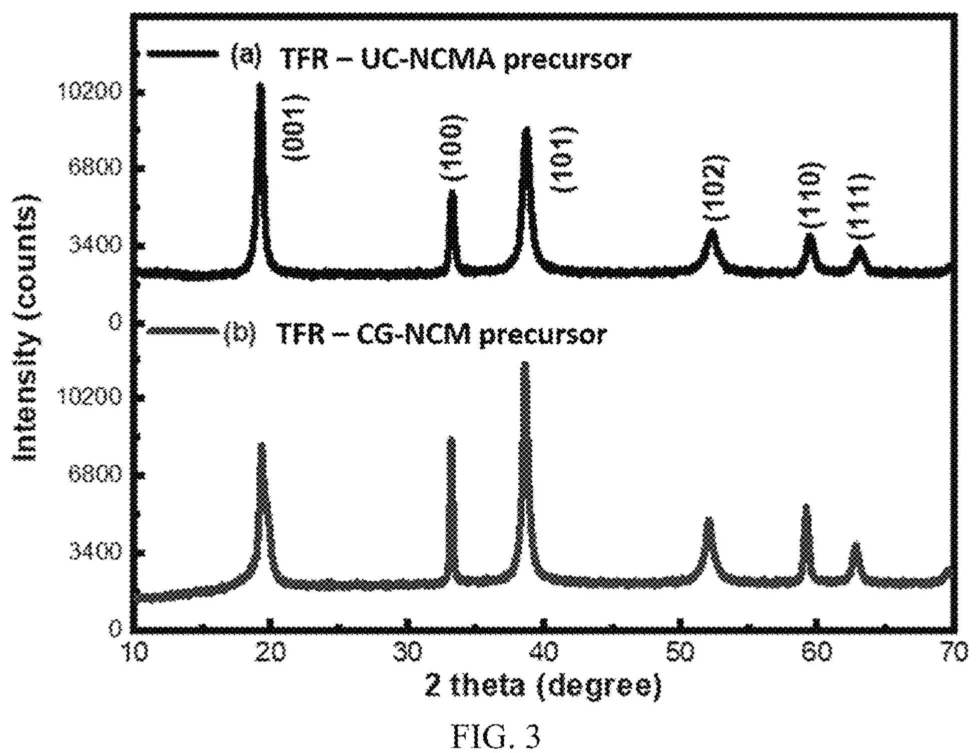
FIG. 3 represents a comparison of XRD patterns between a CG-NCM precursor with concentration gradient and a UC-NCMA precursor with uniform concentration synthesized by a TFR.

A X-ray diffractometer (XRD) is utilized to analyze the crystal plane intensity ratio of the two hydroxide precursors, CG-NCM and UC-NCMA. As shown in FIG. 3, the preferred crystal orientation of the UC-NCMA precursor is (001) crystal plane (2θ=19.2°), while the preferred crystal orientation of the CG-NCM precursor of the present disclosure is (101) crystal plane (2θ=38.6°). Accordingly, the intensity ratio of (101) and (001) crystal planes ($I_{(101)}/I_{(001)}$) of the CG-NCM precursor is 1.45, which is far bigger than the $I_{(101)}/I_{(001)}$ of the UC-NCMA precursor, 0.82.

Particle Size Analysis

Figure 4:
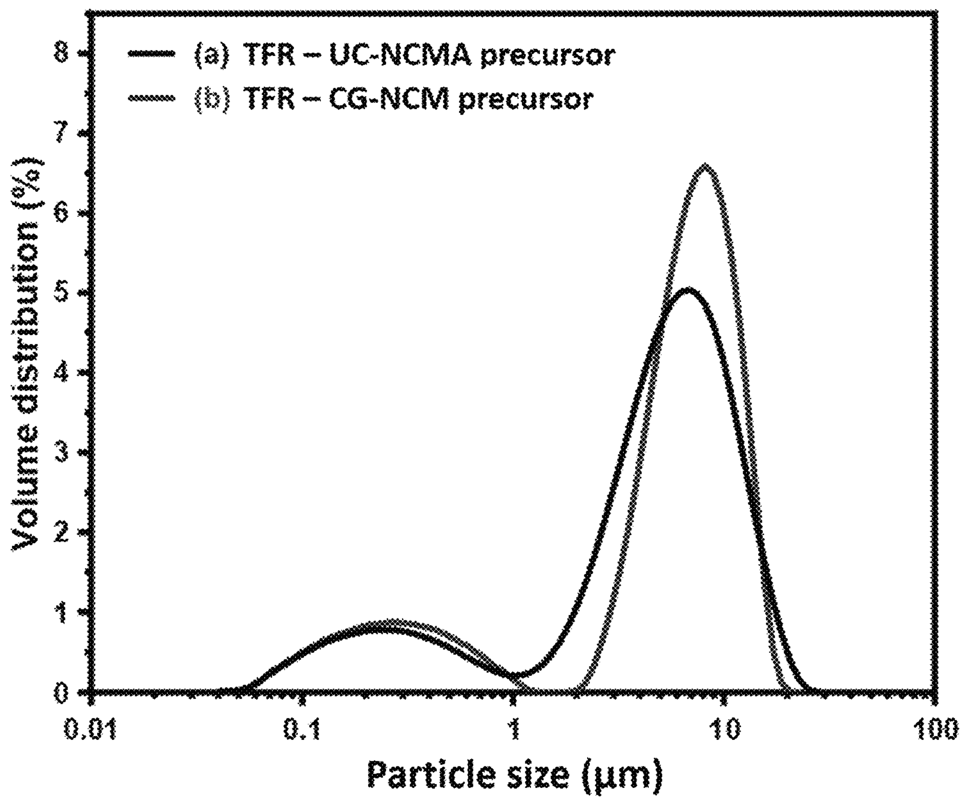
FIG. 4 represents a comparison of particle-size distributions between a CG-NCM precursor with concentration gradient and a UC-NCMA precursor with uniform concentration synthesized by a TFR.

A dynamic light scattering (DLS) is utilized to analyze the particle size of the two hydroxide precursors, CG-NCM and UC-NCMA. As shown in FIG. 4, the two peaks of the particle size distribution of the UC-NCMA precursor are at 0.24 μm and 6.76 μm, while the two peaks of the CG-NCM precursor are at 0.26 μm and 8.15 μm, which demonstrates that the particle size of the CG-NCM precursor is relatively larger and exhibits a narrower particle size distribution.

Morphology Analysis

Figure 5A:
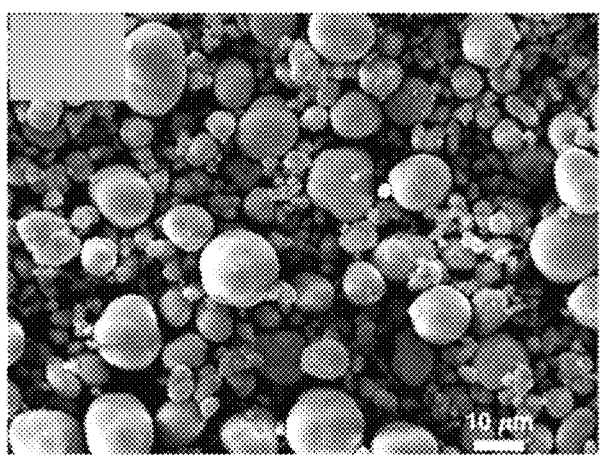
FIG. 5A, FIG. 5B, FIG. 5C and FIG. 5D represent SEM morphology images of a UC-NCMA precursor with uniform concentration prepared by a TFR at different magnifications, respectively.
Figure 5B:
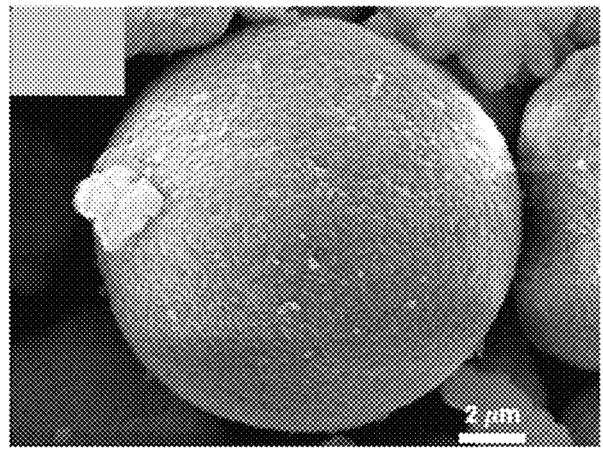
Figure 5C:
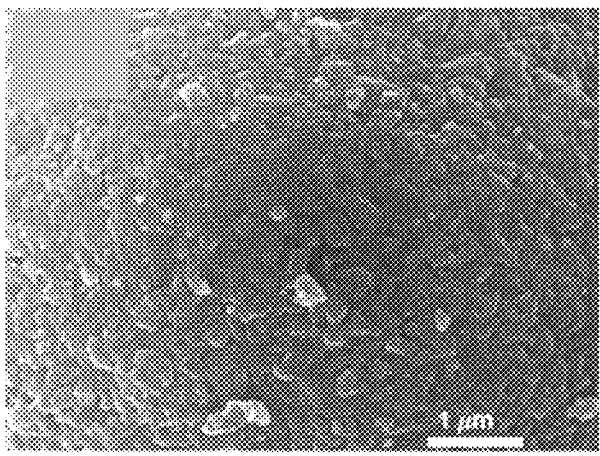
Figure 5D:
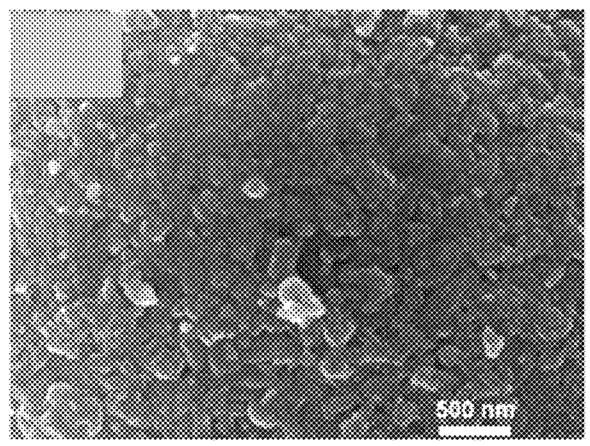
Figure 5E:
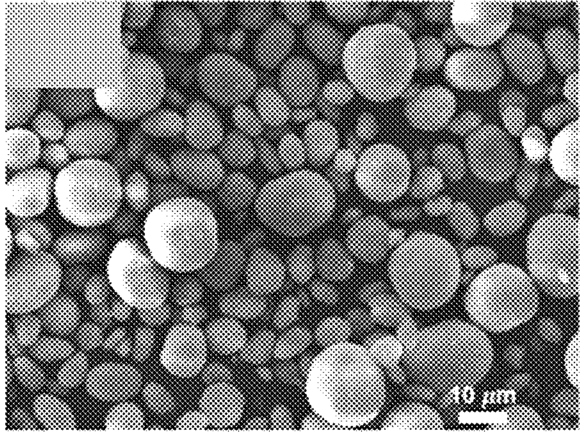
FIG. 5E, FIG. 5F, FIG. 5G and FIG. 5H represent SEM morphology images of a CG-NCM precursor with concentration gradient prepared by a TFR at different magnifications, respectively.
Figure 5F:
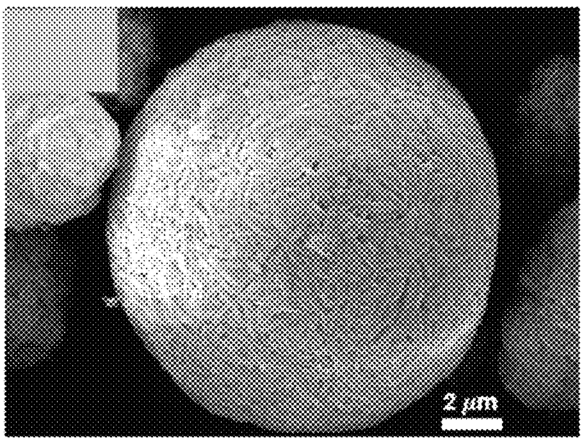
Figure 5G:
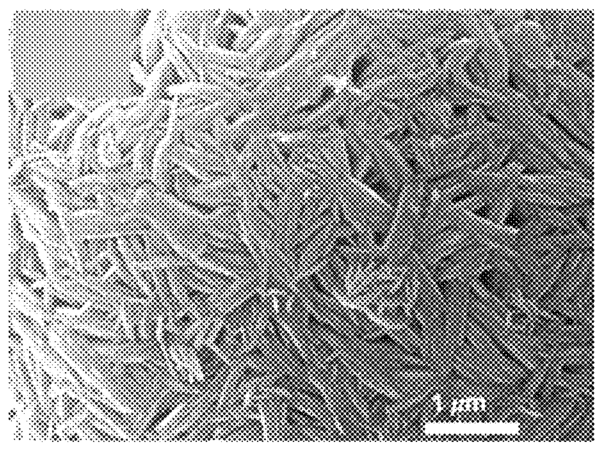
Figure 5H:
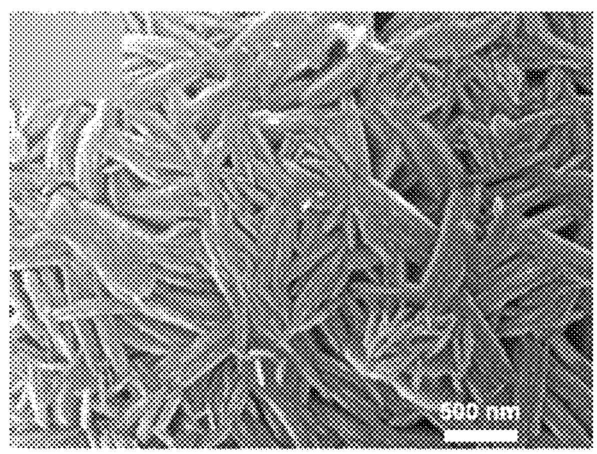

The morphologies of the two hydroxide precursors, CG-NCM and UC-NCMA, are observed by scanning electron microscopy (SEM). FIG. 5A, FIG. 5B, FIG. 5C and FIG. 5D are SEM images of the UC-NCMA precursor at different magnifications, respectively. FIG. 5E, FIG. 5F, FIG. 5G and FIG. 5H are SEM images of the CG-NCM precursor at different magnifications, respectively. As shown in FIG. 5C and FIG. 5D, the morphology of the primary particles of the UC-NCMA precursor is granular, and their secondary particles form sphere-like particles, as shown in FIG. 5A and FIG. 5B. In contrast, as shown in FIG. 5G and FIG. 5H, the morphology of the primary particles of the CG-NCM precursor shows a needle-like shape, and their secondary particles form sphere-like particles, as shown in FIG. 5E and FIG. 5F. The primary particles of the CG-NCM precursor with the needle-like shape have one-dimensional structures, which can resist the microcracks caused by tensile and compressive stresses from the expansion and contraction during a long-term charging/discharging process.

In summary, the method of manufacturing the CG-NCM hydroxide precursor by a TFR in the present disclosure can not only improve the preparation efficiency of continuous mass production, but also produce nickel-rich hydroxide precursors having uniform particles with a narrow particle size distribution, and unique one-dimensional orientation of needle-like primary particles.

Observation of Metal Composition Distribution in the Nickel-Rich Oxides

Instruments and Methods for Analysis

The X-ray diffraction patterns of the CG-NCM precursor and the CG-NCMA oxide powders are obtained by a Bruker D2 PHASER (Cu $K_{\alpha 5}$, λ=0.1534753 nm, 30 kV; Germany) and quantitatively evaluated by a TOPAS software (v. 4.0) employing Rietveld refinement. A scanning electron microscope (SEM; JOEL, JSM-IT200 InTouch Scope™; 15 kV; Japan) is used to observe the microstructures, surface morphologies, and cross-sectional views of the powders, as well as to perform their energy-dispersive X-ray (EDX) for the element distribution analysis. The cross-sectional dissection of the particle samples is performed with a focused ion beam (FIB; FEI Helios G4 UX) to investigate the internal microstructures of the CG-NCM precursor and CG-NCMA oxide powders. A high-resolution transmission electron microscope (HR-TEM; JEOL JEM-2100F; Japan) is used for investigating the microcrystalline structure features. X-ray photoelectron spectroscopy (XPS; PHI5600, PerkinElmer, USA) is used to investigate the oxidation states of the transition metal, C and O atoms, with an Al Ka (1486.6 eV) excitation source and XPSPEAK for data fitting and analyzing.

FIB/SEM and EDX Analysis

Figure 6A:
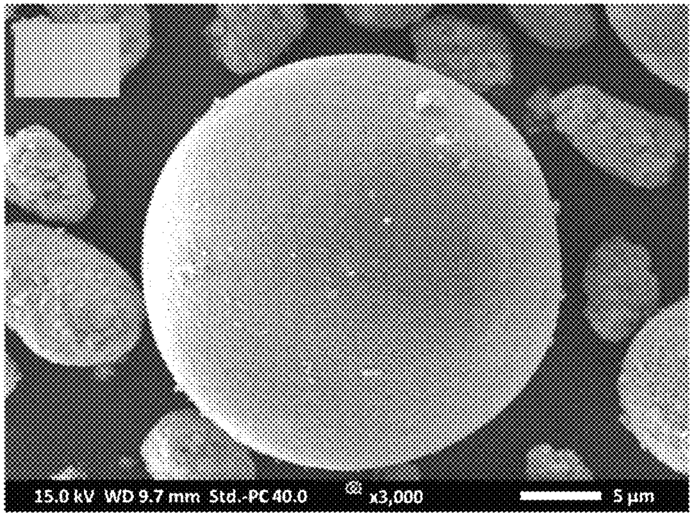
FIG. 6A represents a SEM morphology image of a CG-NCM precursor at low magnification.
Figure 6B:
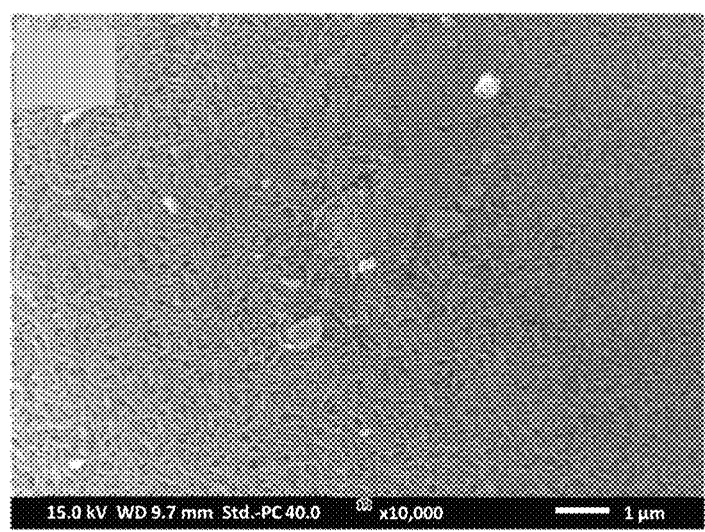
FIG. 6B represents a SEM morphology image of a CG-NCM precursor at high magnification.
Figure 6C:
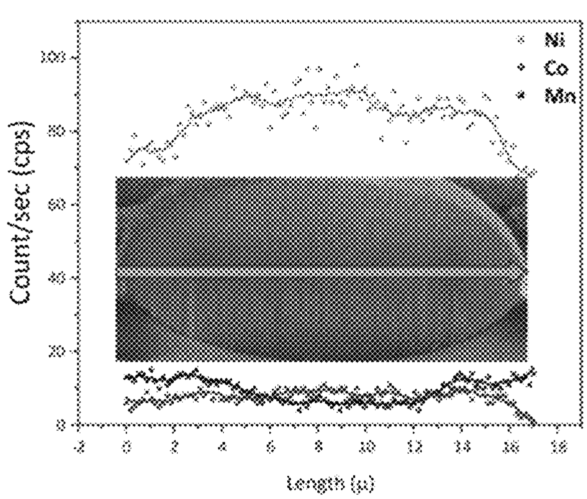
FIG. 6C represents a cross-sectional image dissected by FIB and a line-scanning EDS image of a CG-NCM precursor.
Figure 6D:
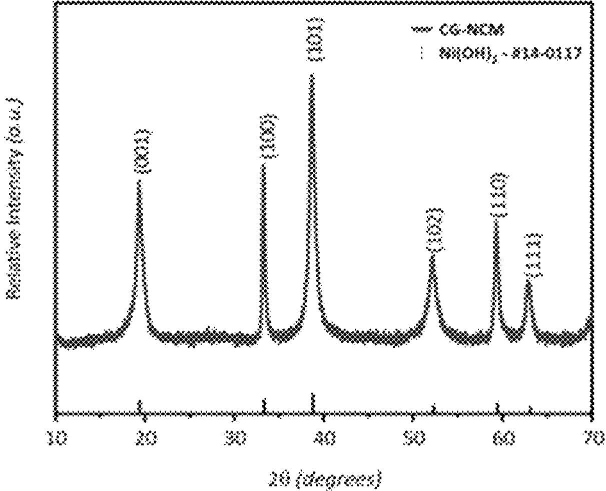
FIG. 6D represents XRD patterns of the synthesized CG-NCM hydroxide precursor sample with concentration gradient.

The CG-NCM precursor of Example 1 is prepared in a TFR at an optimized rotation speed (600 rpm) and pH value (11.2). Therefore, the obtained microspherical structure has a narrow particle size distribution and good sphericity. Also, the obtained CG-NCM precursor with a Mn-concentration-gradient distribution is then thoroughly mixed with the aluminum source and is calcined under optimized conditions, providing the CG-NCMA oxide cathode material with a Mn-rich outer layer and a Al-containing surface. FIG. 6A and FIG. 6B are SEM images of the CG-NCM precursor at low and high magnifications, respectively, wherein the SEM image at high magnification shows the nano-scale needle-like morphology of the primary particles and the SEM image at low magnification shows the spherical secondary particles (with a particle size of about 8~12 μm). The CG-NCM precursor particle is dissected using a FIB, and its internal metal composition distribution in its cross-section direction is determined along a line scan by EDX. FIG. 6C represents each elemental composition distribution of the CG-NCM precursor particle along its cross-section direction (marked by an arrow), wherein it is shown that the Ni concentration is higher in the inner layer and lower near both sides of outer layer of the CG-NCM spherical particle; meanwhile, the Mn concentration increases gradually from the inner layer to the outer layer of the CG-NCM spherical particle. FIG. 6D demonstrates that the XRD pattern of the CG-NCM precursor features clear peaks without any impurity phase, suggesting that, despite the Mn-rich outer layer of the particle, the Mn cations have been incorporated into the structure of the CG-NCM precursor, which represents the homogeneous structure with the element concentration-gradient distribution from inner layer to outer layer of the CG-NCM precursor particle, rather than forming a separate $Mn(OH)_2$ crystal phase on the particle surface.

Figure 7A:
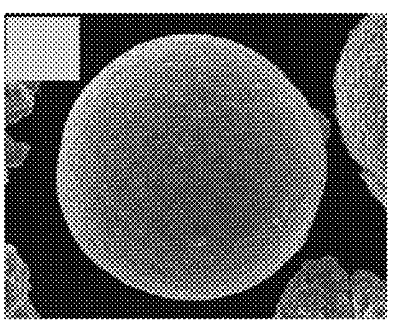
FIG. 7A represents a SEM image of a calcined UC-NCMA particle sample with uniform concentration at a high magnification.
Figure 7B:
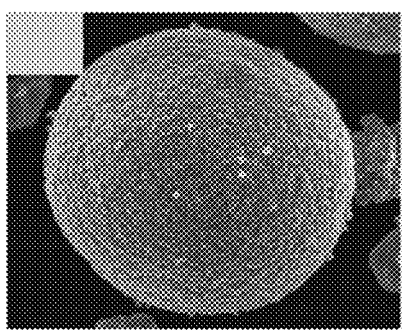
FIG. 7B represents a SEM image of a calcined CG-NCMA particle sample with concentration gradient at a high magnification.
Figure 7C:
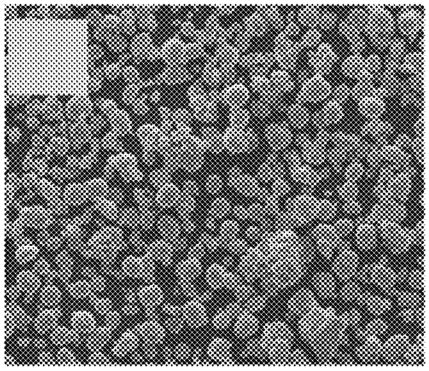
FIG. 7C represents a SEM image of a calcined UC-NCMA particle sample with uniform concentration at a low magnification.
Figure 7D:
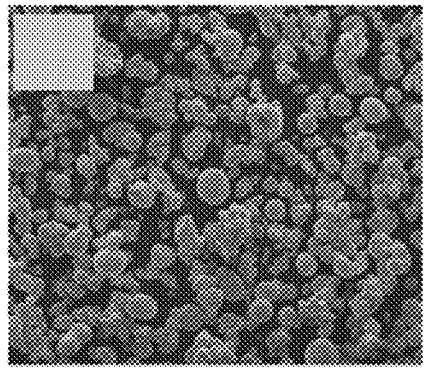
FIG. 7D represents a SEM image of a calcined CG-NCMA particle sample with concentration gradient at a low magnification.
Figure 7E:
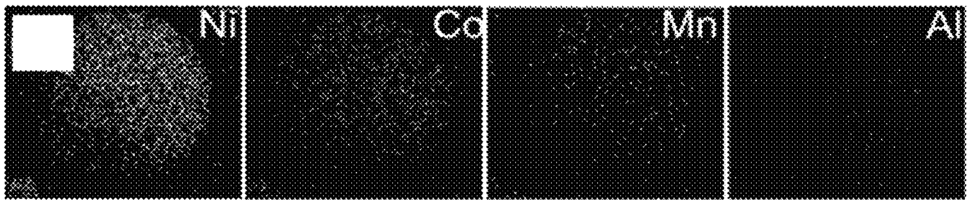
FIG. 7E represents an element distribution of a UC-NCMA oxide sample by EDS mapping.
Figure 7F:
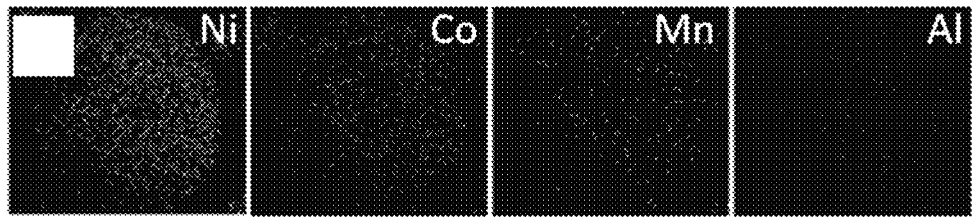
FIG. 7F represents an element distribution of a CG-NCMA oxide sample by EDS mapping.

As shown in FIG. 7A, FIG. 7B, FIG. 7C and FIG. 7D, the spherical morphology of the secondary particles of the UC-NCMA oxide and the CG-NCMA oxide may be retained after the calcination, while the nano-scale needle-like morphology of the primary particles of the CG-NCMA oxide further forms well-crystallized strip-like particles. As shown in the EDX mapping spectra shown in FIG. 7E and FIG. 7F, the surface of a single spherical secondary particle is composed of Ni, Co, Mn, and Al elements and all of the metallic components are dispersed uniformly.

XRD Patterns and Rietveld Refinement

Figure 8A:
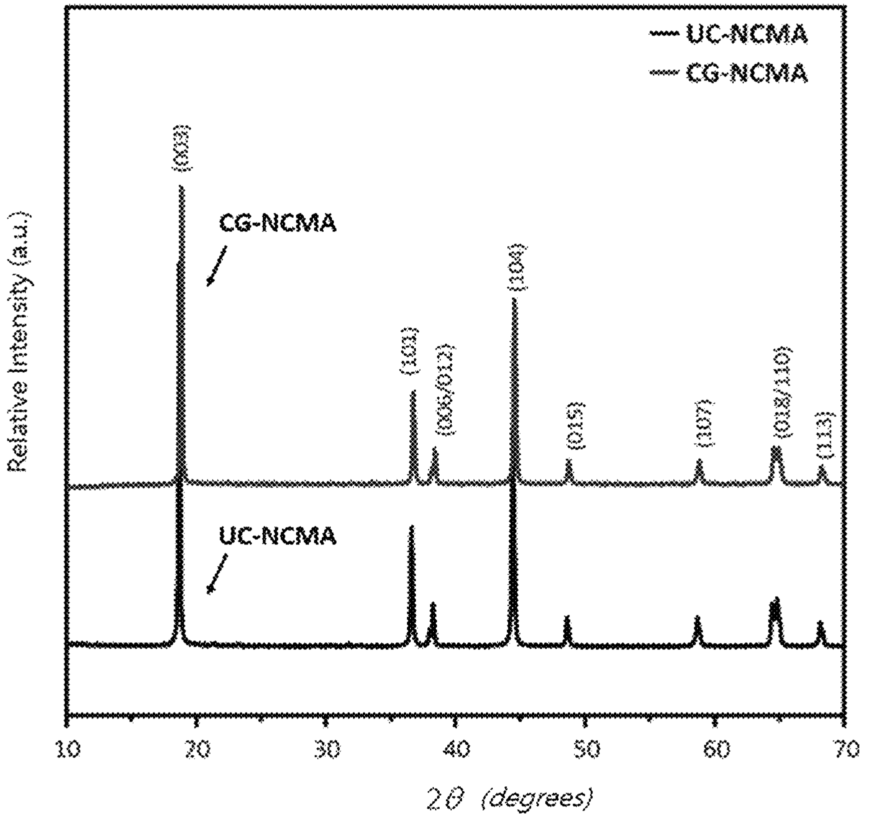
FIG. 8A represents a comparison of XRD patterns of UC-NCMA and CG-NCMA oxide powder samples.
Figures 8B, 8C:
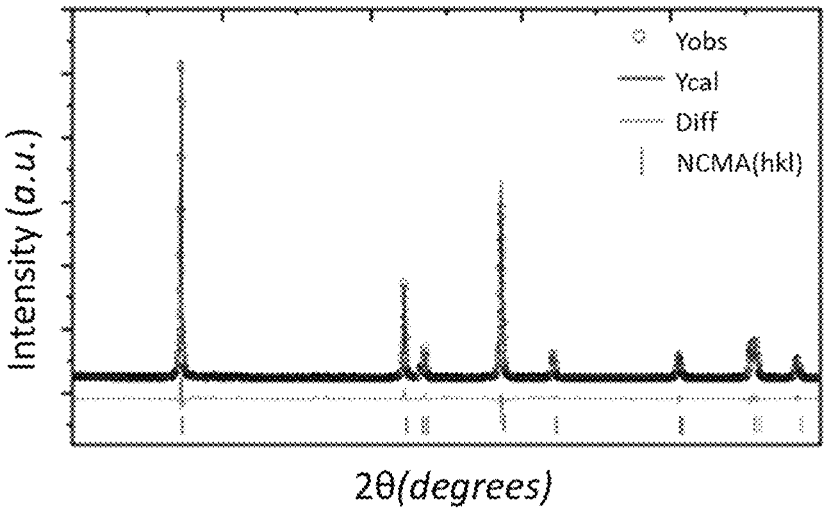
FIG. 8B represents a XRD pattern of a UC-NCMA oxide powder sample after a Rietveld refinement.
FIG. 8C represents a XRD pattern of a CG-NCMA oxide powder sample after a Rietveld refinement.

FIG. 8A shows the comparison of the XRD patterns of the UC-NCMA oxide and the CG-NCMA oxide powders. According to the patterns, all diffraction peaks can be indexed well to a hexagonal $\alpha$-$NaFeO_2$ structure having the R-3m space group with high crystallinity. It is also found that the (006)/(012) and (018)/(110) peaks show clear splitting, which indicates the ordered crystal structures of the materials. Furthermore, the intensity ratio of the (003) and (104) peaks (R (003)/(104)) for the UC-NCMA oxide is 1.68, while the R (003)/(104) for the CG-NCMA oxide is 1.55, which are both beyond 1.2, indicating that the UC-NCMA oxide and the CG-NCMA oxide powder samples are prepared at low level of cation mixing, giving these NCMA-based cathode materials good crystal structures. Then, the XRD patterns are fitted using Rietveld refinement to compare the lattice parameters and the analyzed refinement results of the two powder samples, as shown in FIG. 8B and FIG. 8C. The related data is listed in Table 1.

TABLE 1

| Powder sample | Lattice parameters | | | | Refinement analysis | | |
|---|---|---|---|---|---|---|---|
| | a(Å) | c(Å) | c/a | V(Å$^3$) | $R_{(003)/(104)}$ | $Ni_{occ}$ | $R_p/R_{wp}$ |
| UC-NCMA | 2.874 | 14.197 | 4.939 | 101.5 | 1.68 | 0.03 | 2.44/3.86 |
| CG-NCMA | 2.876 | 14.202 | 4.938 | 101.7 | 1.55 | 0.01 | 2.34/3.62 |

TEM Micrographic Images Analysis

Figure 9A:
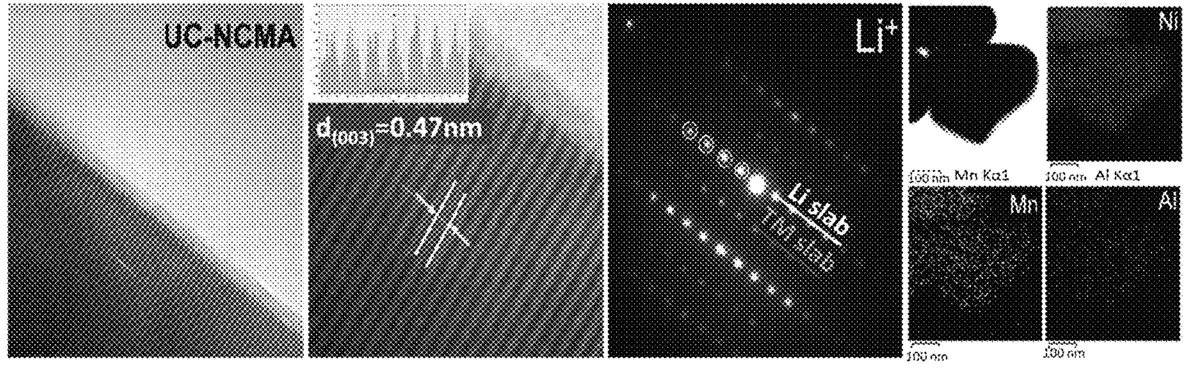
FIG. 9A and FIG. 9B represent TEM micrographic images, selected area electron diffraction (SAED) images and EDS-mapping element distribution patterns of a UC-NCMA particle sample (FIG. 9A) and a CG-NCMA particle sample (FIG. 9B).
Figure 9B:
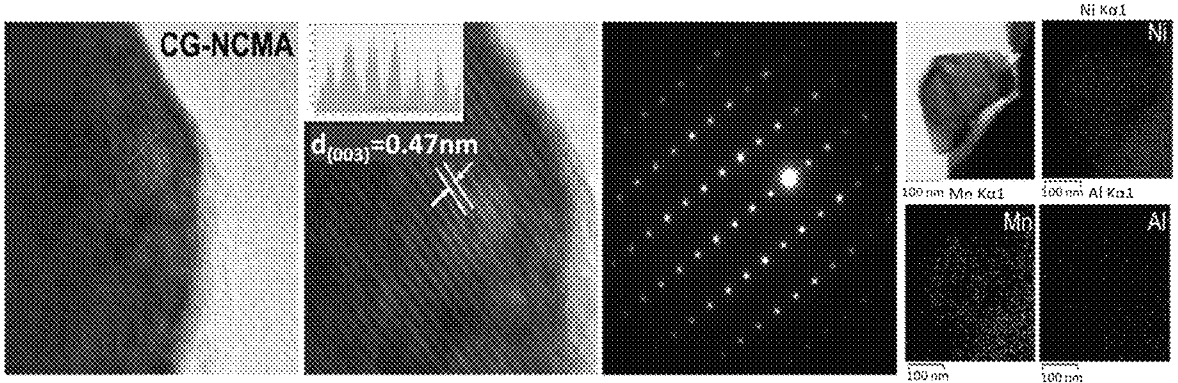

As shown in FIG. 9A and FIG. 9B, TEM is used to observe the detailed microstructures and crystal phases of the UC-NCMA oxide and CG-NCMA oxide particle samples, respectively. The primary particles of the UC-NCMA oxide and CG-NCMA oxide possess well-defined layered crystalline structures. The Digital Micrograph Software is used to match the lattice fringes in both primary particle samples to the crystal plane of the hexagonal phase (003), which has an interplanar spacing of 0.47 nm. Furthermore, selected area electron diffraction (SAED) patterns reveal the great crystallinity and perfectly layered structures of these primary particle samples. TEM-EDX analysis (FIG. 9B) also shows the concentration-gradient distribution of the primary particle sample of CG-NCMA oxide. It shows that all of the metal elements are uniformly distributed throughout the primary particle. The concentrations of Mn and Al are much higher at the surface of the particle, relative to that of Ni, which is in line with the results of the aforementioned FIB/SEM and EDX line scan. The greater concentrations of Mn and Al at the grain boundaries may suppress the side reactions between the cathode material and reactive electrolyte, meanwhile enhance the material's structural stability, thereby enhancing the cycling performance of the resulting LIBs.

XPS Measurements Analysis

Figure 10A:
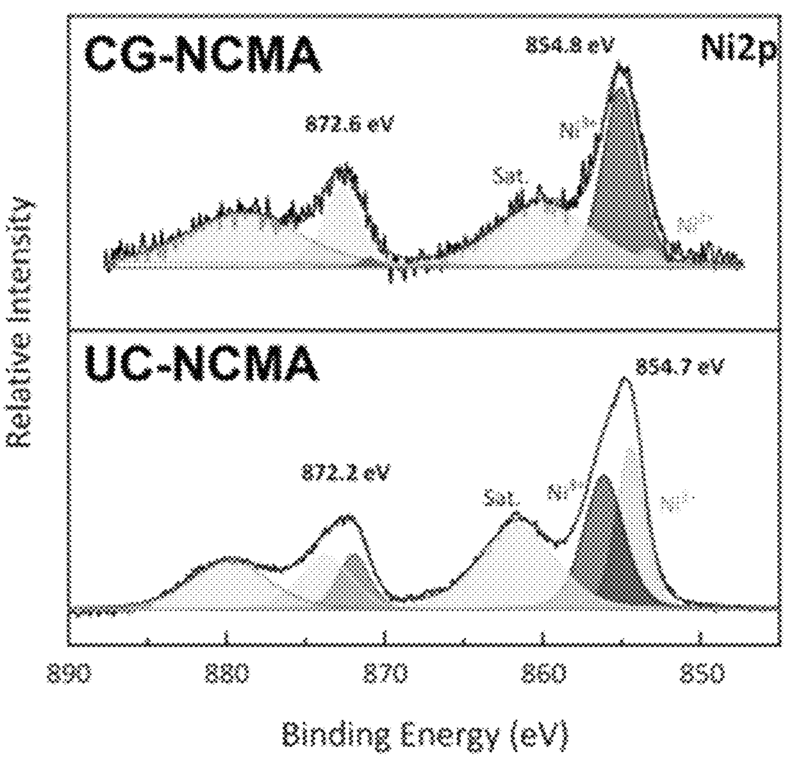
FIG. 10A, FIG. 10B, FIG. 10C, FIG. 10D, FIG. 10E and FIG. 10F represent XPS spectra of each elemental composition, Ni 2p (FIG. 10A), O 1s (FIG. 10B), Co 2p (FIG. 10C), Mn 2p (FIG. 10D), Li 1s (FIG. 10E), C 1s (FIG. 10F), respectively, of a UC-NCMA powder sample and a CG-NCMA powder sample.

XPS measurements are performed on the samples of the CG-NCMA oxide and the UC-NCMA oxide particle samples to study the elemental composition and chemical valences of the transition metals. As shown in FIG. 10A, the Ni 2p spectra features two distinct peaks at 855 eV (Ni 2p3/2) and 872 eV (Ni 2p1/2), along with two satellite peaks, wherein the peak at 855 eV is obtained by overlapping and fitting to the two peaks, $Ni^{3+}$ and $Ni^{2+}$, which simultaneously co-exist on the surface of the cathode material. If $Ni^{2+}$ ions would migrate readily from the transition metal (TM) slab into the Li slab and occupy the $Li^+$ sites, it may cause permanent structural disorder and lead to capacity loss of LIBs.

The semi-quantitative analysis reveals that, as shown in FIG. 10A, the proportion of the $Ni^{2+}$ ions in the CG-NCMA oxide is much lower than that in the UC-NCMA oxide (CG-NCMA=6%, UC-NCMA=46%). Furthermore, the concentration-gradient distribution of the $Mn^{4+}$ ions may promote a decrease in the number of Ni ions changing from $Ni^{3+}$ to $Ni^{2+}$ in the surface region, thereby shifting the valence of the Ni ions in the surface region. Also, the higher proportion of the $Ni^{3+}$ ions in the CG-NCMA oxide indicates that the material exhibits high oxidation states after calcination, thereby effectively reducing the level of cation mixing.

Figure 10B:
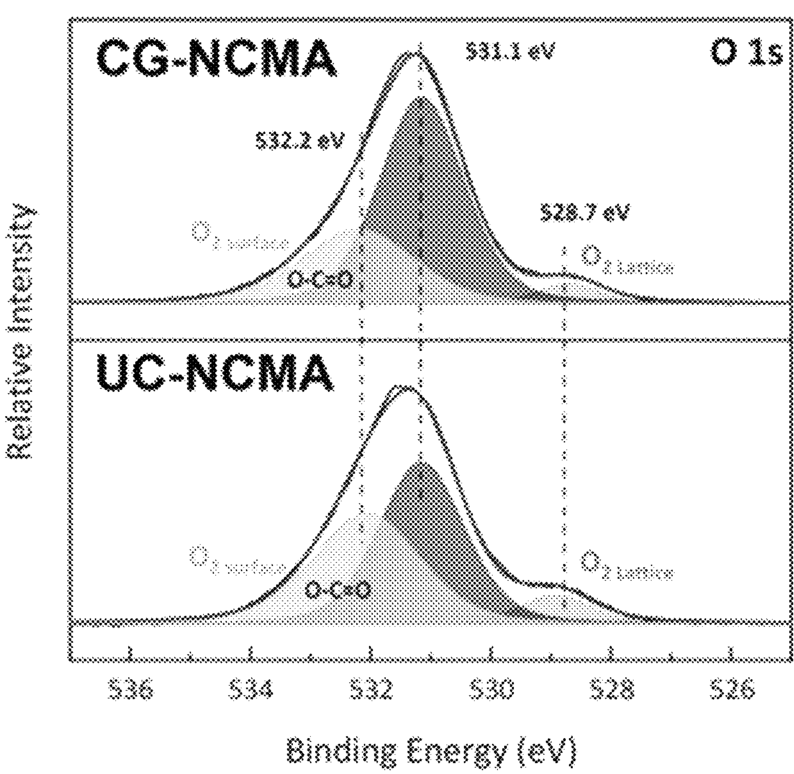
Figure 10C:
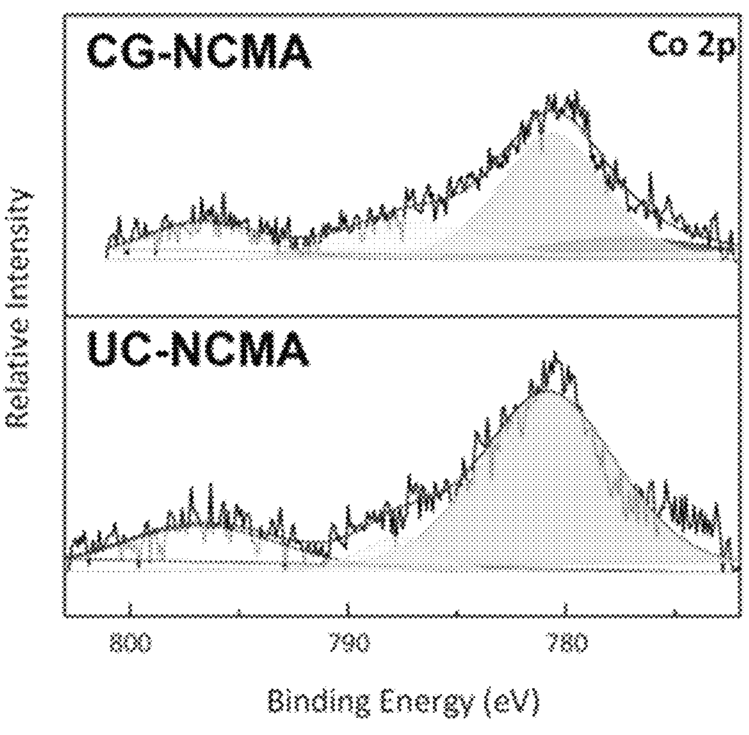
Figure 10D:
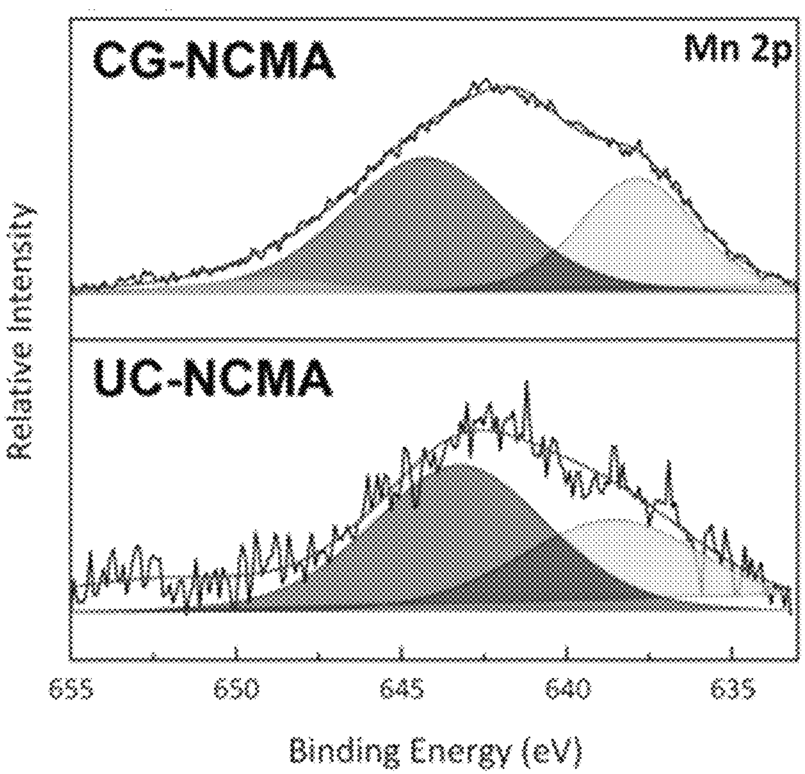

FIG. 10B shows O 1s spectra fitted into peaks corresponding to lattice and surface O element at 529 and 532 eV, respectively. The signals for the C—O of the CG-NCMA oxide are less intense, suggesting a less amount of surface $Li_2CO_3$ residue. FIG. 10C and FIG. 10D show the XPS spectra for Co 2p and Mn 2p after fitting, respectively, wherein the Co valence is +3 ($Co^{3+}$) and Mn valence is +4 ($Mn^{4+}$). As shown in FIG. 10C and FIG. 10D, relative to the UC-NCMA oxide, the CG-NCMA oxide has Co 2p signals with lower intensity and Mn 2p signals with higher intensity, indicating that the CG-NCMA oxide has the Mn with higher concentration in the surface region.

Figure 10E:
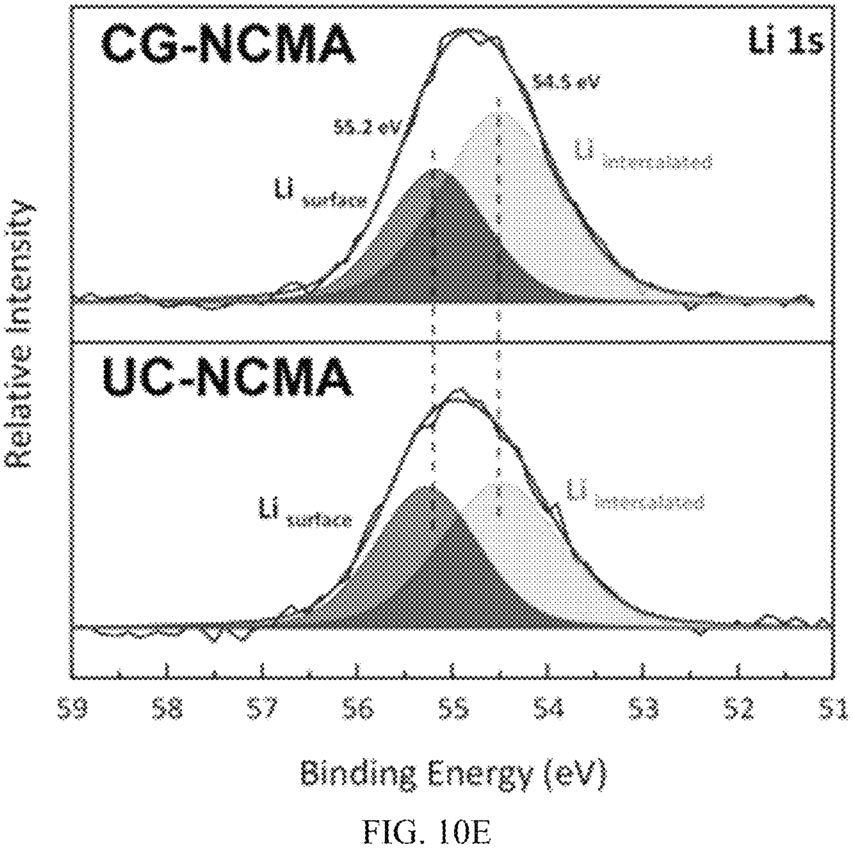
Figure 10F:
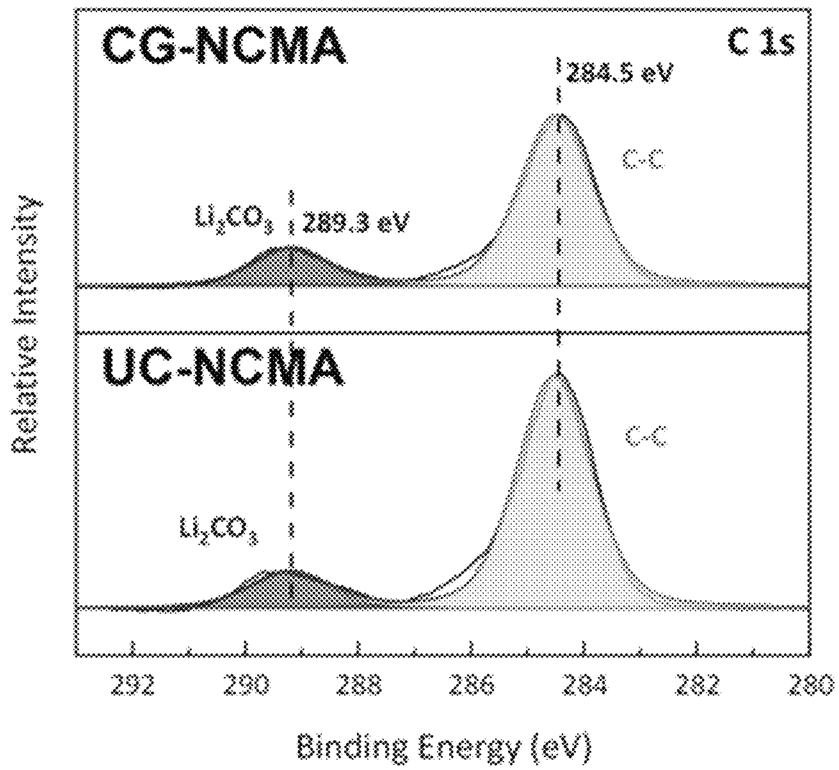

As shown in the XPA spectra for Li 1s in FIG. 10E and the XPS spectra for C 1s in FIG. 10F, the CG-NCMA oxide has the signals for the surface Li and C═O carbon atoms with lower intensity than those of the UC-NCMA oxide, suggesting the less formation of surface Li-containing impurities (e.g., $Li_2CO_3$ and LiOH) in the CG-NCMA oxide.

Electrochemical Measurements

The NCMA-based oxide cathodes including the UC-NCMA oxide and the CG-NCMA oxide materials are prepared by coating on Al-foil current collector with cathode slurry combinations containing 80% of the NCMA-based active material, 10% conductive carbon black (Super PR), and 10% poly(vinylidene di-fluoride) (PVDF) binder, which is dissolved in N-methyl pyrrolidone (NMP) solvent. The cathodes are dried in a vacuum oven at 120° C. for 12 hours. Circular discs with the diameter of 13 mm are punched to acquire the NCMA-based cathode electrodes (mass loading=2.5 mg/cm$^2$) and CR-2032 coin cells are assembled using Li metal foil as the anode electrode and 1 M $LiPF_6$ in ethylene carbonate (EC)/diethyl carbonate (DEC) solvents with a volume ratio of 1:1 as the electrolyte.

All electrochemical measurements for charging/discharging tests are performed using a BCS-805 workstation (Bio-Logic, France). The manufactured LIBs are galvanostatically charged and discharged in a voltage range from 2.8 to 4.3 V (vs. Li/$Li^+$). The cycle life test is performed over 100 and 200 cycles at a 1 C/1 C charging/discharging rate (1 C=200 mA/g). The rate capability tests are performed at low/high current rates from 0.2 C to 10 C. The cyclic voltammetry experiments are performed in a voltage range from 2.5 to 4.3 V (vs. Li/$Li^+$) at a scan rate of 0.01 mV/s. Electrochemical impedance spectroscopy (EIS) is conducted using a MetrOhm AutoLab® system in a frequency range from 100 kHz to 0.01 Hz with an AC amplitude of 5 mV.

Figure 11A:
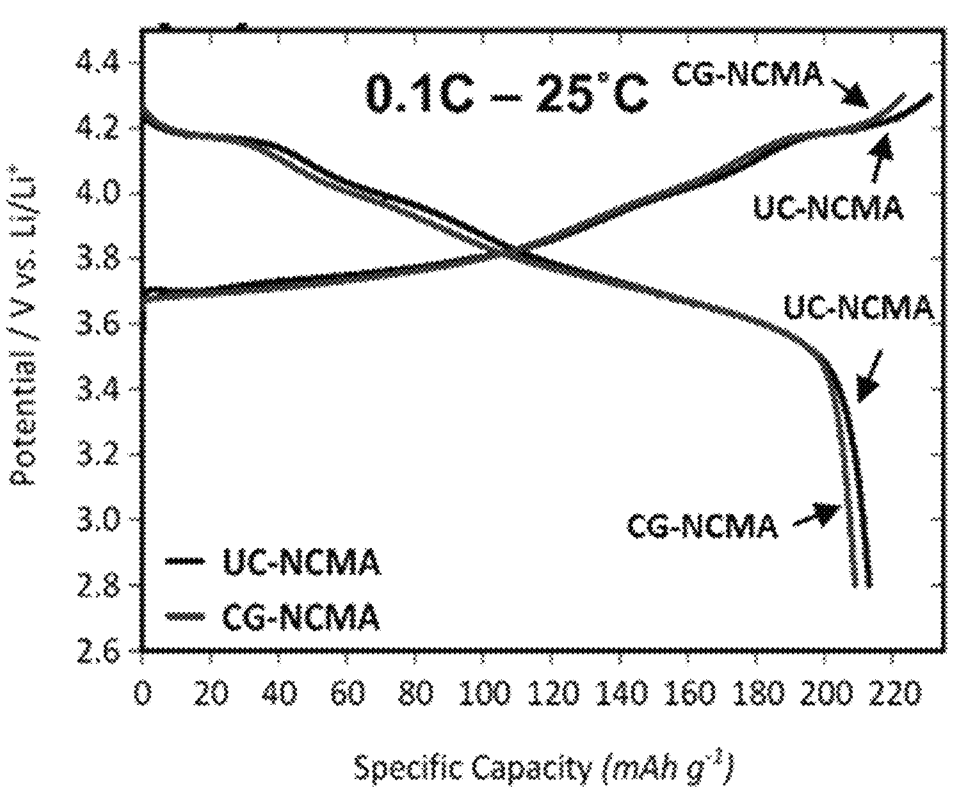
FIG. 11A represents a comparison of electrochemical performance of the UC-NCMA/Li and CG-NCMA/Li cells, including initial charging/discharging curves at 0.1 C, and 25° C.

FIG. 11A shows the initial charging/discharging curve of the UC-NCMA cathode and the CG-NCMA cathode in the NCMA/Li half-cells tested in the voltage range from 2.8 and 4.3 V (vs. Li/Li+) at 0.1 C. The UC-NCMA-based cell has an initial discharge capacity of about 213 mAh/g, while the CG-NCMA-based cell has an initial discharge capacity of about 209 mAh/g, which is slightly lower than that of the UC-NCMA-based cell. This is because the CG-NCMA oxide has relatively lower content of Ni element in the outer layer and the presence of Al element on the surface due to its concentration-gradient distribution.

Figure 11B:
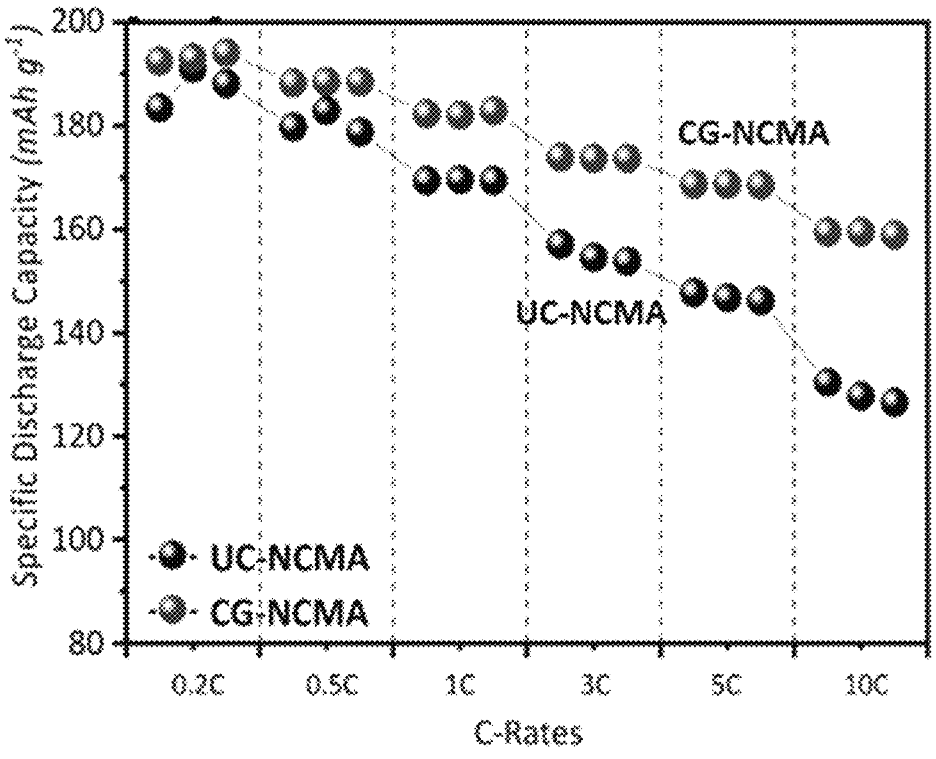
FIG. 11B represents a comparison of the electrochemical performance at low/high current rates within 0.2 C to 10 C.
Figure 11C:
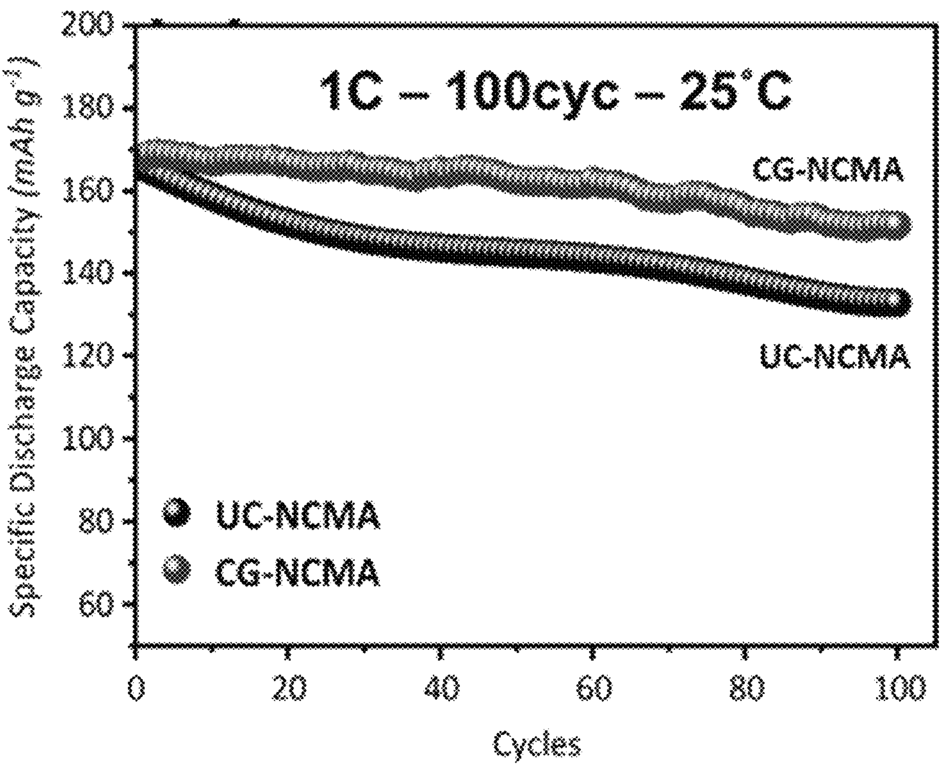
FIG. 11C represents a comparison of the electrochemical performance of the cells at 1 C, and 25° C. for 100 cycles.
Figure 11D:
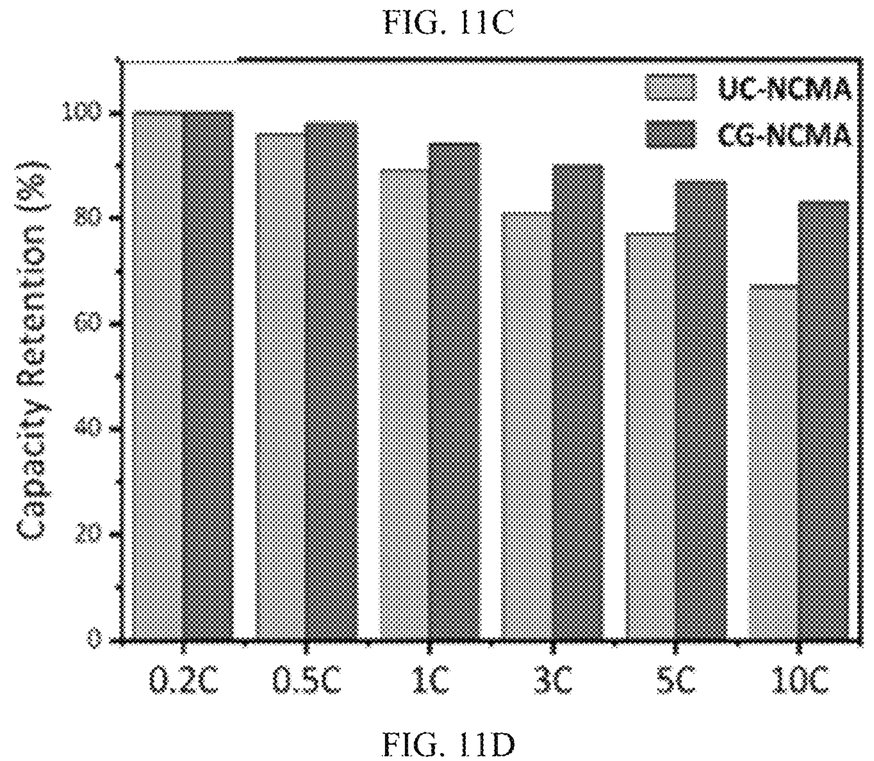
FIG. 11D represents the bar diagram of the capacity retention of the cells at different C-rates (0.2 C to 10 C)
Figure 12A:
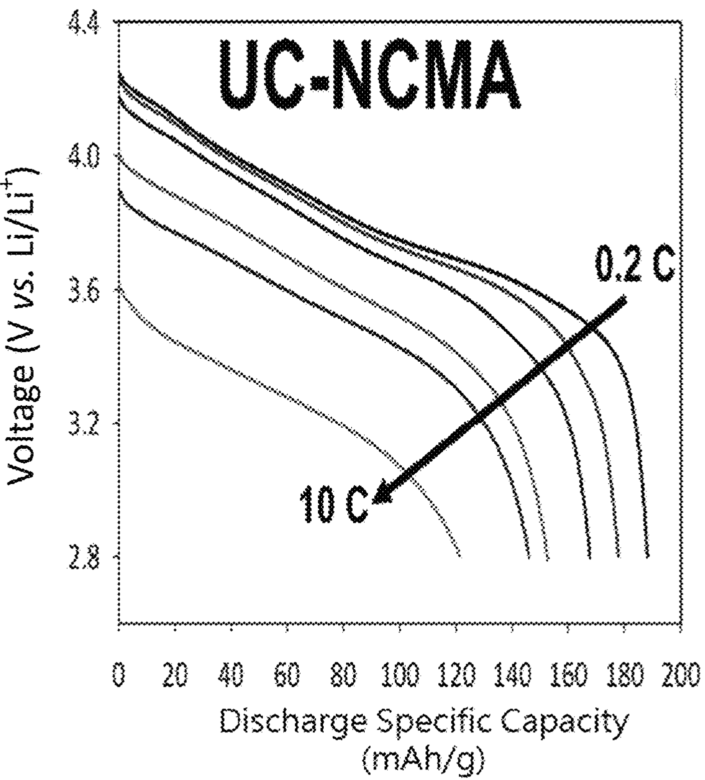
FIG. 12A represents a comparison of discharge curves for the rate capability (0.2 C to 10 C) of the UC-NCMA/Li cells.
Figure 12B:
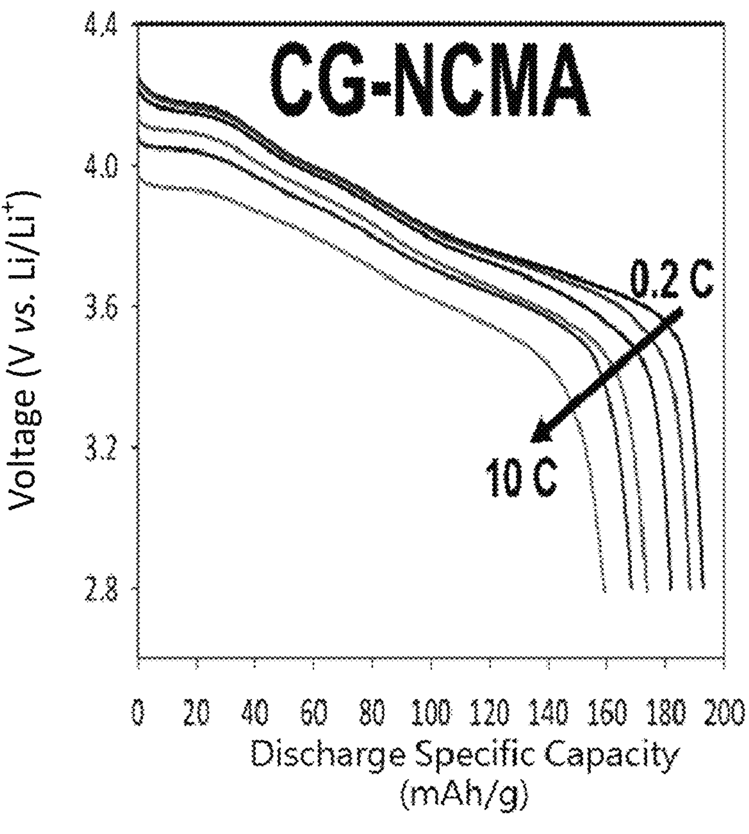
FIG. 12B represents a comparison of discharge curves for the rate capability (0.2 C to 10 C) of the CG-NCMA/Li cells.

As shown in FIG. 11B and FIG. 11D, the rate capabilities of the two cathodes are tested at low/high discharging rates of 0.2, 0.5, 1, 3, 5, and 10 C at a cutoff voltage of 4.3 V (vs. Li/$Li^+$). The results show that the discharge specific capacities of the cell with the CG-NCMA oxide cathode are higher than those of the cells with the UC-NCMA oxide cathode. Especially at high rates of 5 C and 10 C, the CG-NCMA oxide cathode exhibits discharge specific capacities of 168.7 and 159.5 mAh/g, while the UC-NCMA oxide cathode exhibits discharge specific capacities of only 146.8 and 127.7 mAh/g, respectively. The low/high discharge curves of the two cathodes are shown in FIG. 12A and FIG. 12B. FIG. 11D reveals that the cell with the CG-NCMA oxide cathode retains a capacity retention rate of 83% of the 0.2 C discharge specific capacity (100%) at a high 10 C rate, while the cell with the UC-NCMA oxide cathode retains a capacity retention rate of only 67%.

In summary, the improved electrochemical performance of the LIBs by adopting the CG-NCMA oxide cathode could be attributed to its intact and stable crystal structure, and its tolerance against material strain during charging/discharging. In contrast, the UC-NCMA oxide cathode tends to suffer losses of discharge specific capacity at higher discharging rates, presumably due to the generated microcracks and collapse of the oxide structure in the cathode material.

Figure 11E:
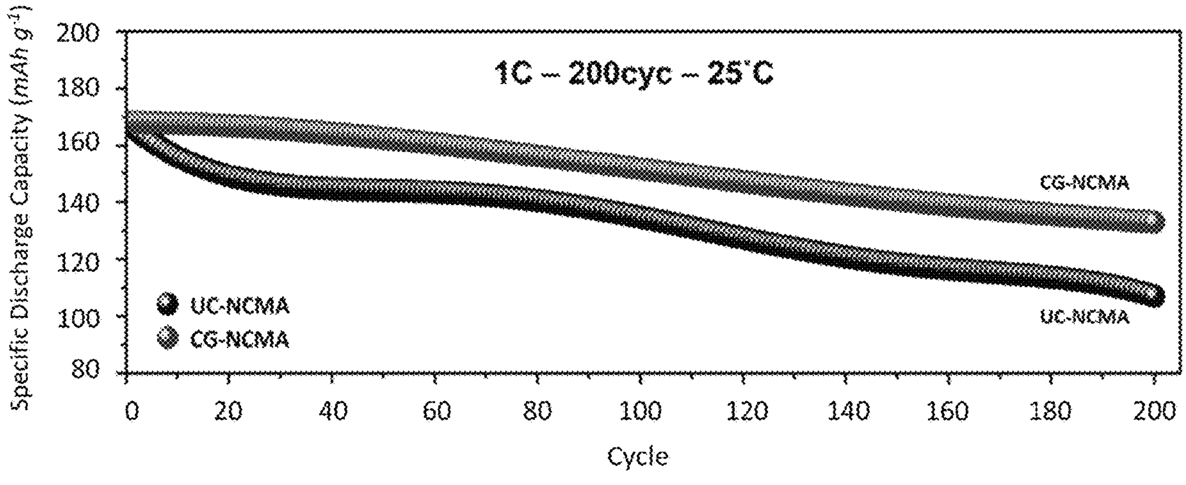
FIG. 11E represents a comparison of the electrochemical performance of the cells at 1 C, and 25° C. for 200 cycles.

FIG. 11C shows the comparison of the electrochemical performances of the cells with the UC-NCMA oxide cathode and the CG-NCMA oxide cathode at a charging/discharging rate of 1 C/1 C and the cutoff voltage of 2.8 to 4.3 V (vs. Li/Li+) at 25° C. after 100 cycles. The results show that the cell with the CG-NCMA oxide cathode exhibits a capacity retention rate of 91.5% for the initial specific capacity and has a excellent cycling stability, while the UC-NCMA-based cell exhibits a capacity retention rate of only 83.4%. Furthermore, after the charging/discharging cycling test over 200 cycles under the same testing conditions, as shown in FIG. 11E, the CG-NCMA-based cell still retains a capacity retention rate of 80.2%, while the UC-NCMA-based cell remains a capacity retention rate of only 64.1%.

Table 2 shows the comparison of the electrochemical performances of the NCMA//Li cell composed of the oxide cathode material with concentration-gradient (i.e., CG-NCMA) prepared by the method of the present disclosure and several LIBs of the prior arts. As shown in Table 2, the CG-NCMA oxide cathode of the present disclosure has considerable advantages on cycling stability, because of the Mn-rich outer layer and the Al-rich surface of the CG-NCMA oxide, which bring better structural stability for the material. Also, this element concentration-gradient distribution may effectively suppress the side reactions induced by the contact between the cathode and the electrolyte in long-term cycling.

TABLE 2

| Prior arts | Cathode material | Element with concentration-gradient | Discharge specific capacity (mAh/g)/current rate | Capacity retention (%)/cycles/current rate |
| --- | --- | --- | --- | --- |
| 1 | $LiNi_{0.90}Co_{0.07}Mg_{0.03}O_2$ | Mg | 197/0.1 C | 80.9/300/1 C |
| 2 | $LiNi_{0.815}Co_{0.15}Al_{0.035}O_2$ | Mn | 193/0.1 C | 91.3/100/1 C |
| 3 | $LiNi_{0.76}Co_{0.09}Mn_{0.015}O_2$ | Al | 208/0.1 C | 95.0/100/0.5 C |
| 4 | $LiNi_{0.7}Co_{0.15}Mn_{0.15}O_2$ | Mn | 200/0.1 C | 94.6/200/1 C |
| 5 | $LiNi_{0.85}Co_{0.12}Mn_{0.03}O_2$ | Mn | 208/0.1 C | 87.9/100/1 C |
| The present disclosure | $LiNi_{0.90}Co_{0.04}Mn_{0.03}Al_{0.03}O_2$ | Mn, Al | 209/0.1 C | 91.5/100/1 C |

The Prior Arts:

1. Y. Zhang, H. Li, J. Liu, J. Zhang, F. Cheng, J. Chen, $LiNi_{0.90}Co_{0.07}Mg_{0.03}O_2$ cathode materials with Mg-concentration gradient for rechargeable lithium-ion batteries, Journal of Materials Chemistry A 7 (36) (2019) 20958-20964.
2. C.-L. Xu, W. Xiang, Z.-G. Wu, Y.-D. Xu, Y.-C. Li, M.-Z. Chen, G. Xiao Dong, G.-P. Lv, J. Zhang, B.-H. Zhong, Constructing a Protective Pillaring Layer by Incorporating Gradient $Mn^{4+}$ to Stabilize the Surface/Interfacial Structure of $LiNi_{0.815}Co_{0.15}Al_{0.035}O_2$ Cathode, ACS Applied Materials & Interfaces 10 (33) (2018) 27821-27830.
3. U.-H. Kim, S.-T. Myung, C. S. Yoon, Y.-K. Sun, Extending the Battery Life Using an Al-Doped $Li[Ni_{0.76}Co_{0.09}Mn_{0.15}]O_2$ Cathode with Concentration Gradients for Lithium Ion Batteries, ACS Energy Letters 2 (8) (2017) 1848-1854.
4. P. Hou, F. Li, Y. Sun, H. Li, X. Xu, T. Zhai, Multishell Precursors Facilitated Synthesis of Concentration-Gradient Nickel-Rich Cathodes for Long-Life and High-Rate Lithium-Ion Batteries, ACS Applied Materials and Interfaces 10 (29) (2018) 24508-24515.
5. K. Du, C. Hua, C. Tan, Z. Peng, Y. Cao, G. Hu, A high-powered concentration-gradient $Li(Ni_{0.85}Co_{0.12}Mn_{0.03})O_2$ cathode material for lithium ion batteries, Journal of Power Sources 263 (2014) 203-208.

Figure 13A:
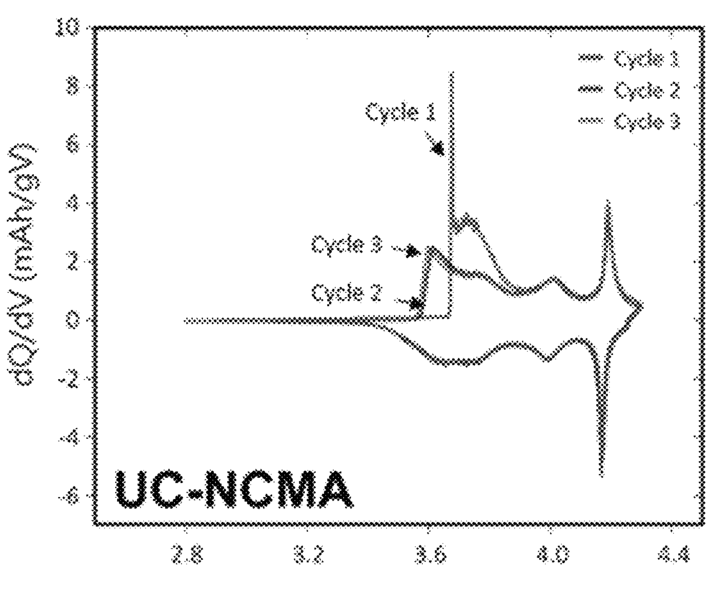
FIG. 13A and FIG. 13B represent a comparison of the electrochemical properties of the NCMA/Li cells, including: differential capacity versus voltage curves of the cells composed of the UC-NCMA oxide cathode (FIG. 13A) and the CG-NCMA oxide cathode (FIG. 13B) at 0.1 C for 3 cycles (voltage range=2.8~4.3 V)
Figure 13B:
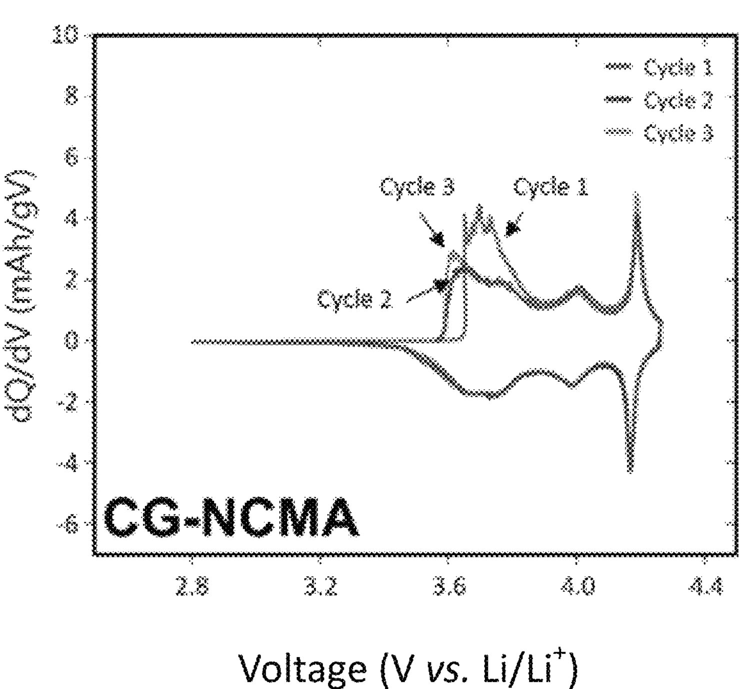

FIG. 13A and FIG. 13B present curves of differential capacity versus voltage analysis (DCA; dQ/dV vs. V) after 3 cycles at 0.1 C. Three typical phase transitions for inter-transitions between hexagonal and monoclinic phases are observed, with anodic and cathodic peaks expected to undergo positive and negative shifts, respectively, as a result of polarization upon subsequent cycling. The three cycles in FIG. 13A and FIG. 13B are mostly overlapped well, indicating that the UC-NCMA oxide cathode and the CG-NCMA oxide cathode have high stability and electrochemical reversibility at the low charging/discharging rate.

Figure 13C:
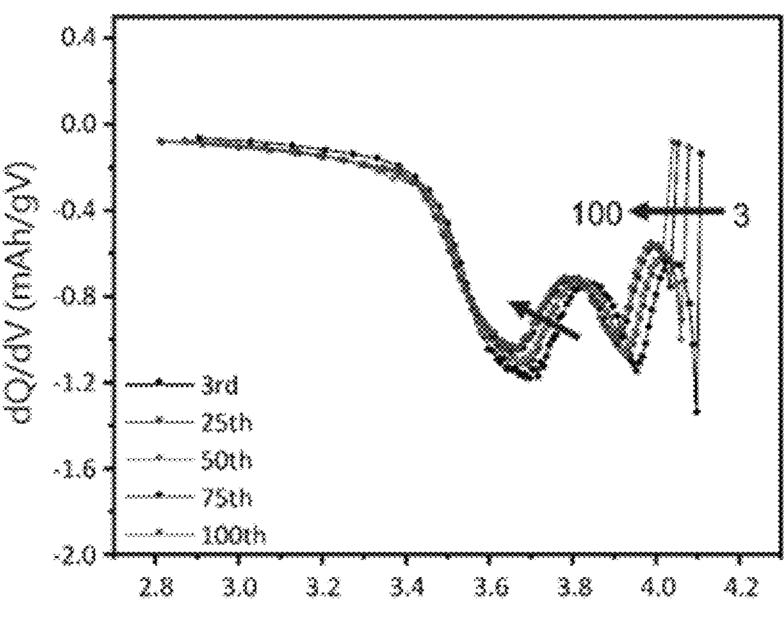
FIG. 13C and FIG. 13D represent discharging curves of the cells composed of the UC-NCMA oxide cathode (FIG. 13C) and the CG-NCMA oxide cathode (FIG. 13D) at a 1 C/1 C rate for 100 cycles.
Figure 13D:
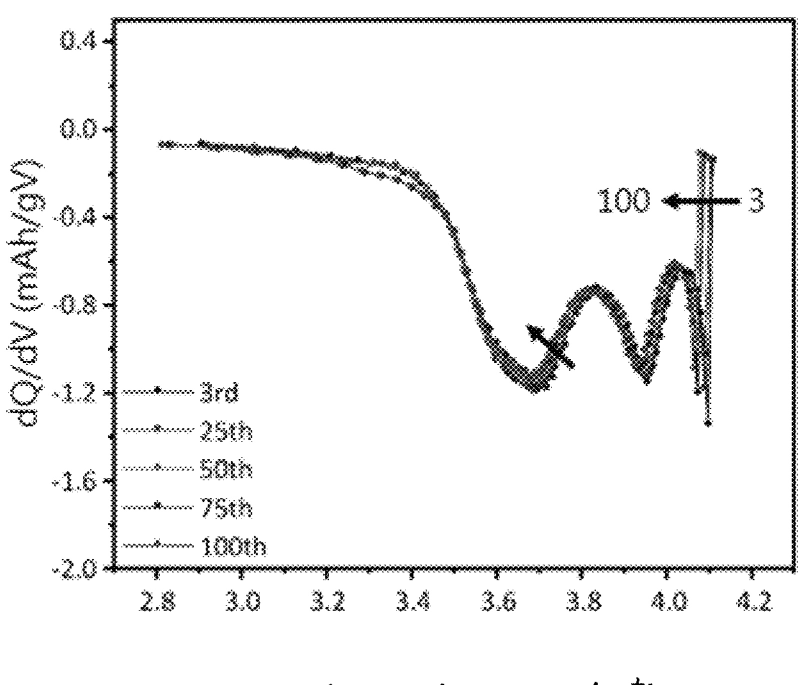

However, as shown in FIG. 13C, polarization is evident and severe in the cell with the UC-NCMA oxide cathode after 100 cycles at a 1 C charging/discharging rate, wherein the cathode peak at 4.2 V is a measurement benchmark of the reversibility of the H2↔H3 phase transition. In contrast, the dQ/dV curves remain virtually overlapped in the CG-NCMA oxide cathode throughout 100 charging/discharging cycles at 1 C, as shown in FIG. 13D. Accordingly, the CG-NCMA oxide cathode prepared by the method of the present disclosure has excellent intrinsic structural stability and may effectively improve the electrochemical performances of the resulting LIBs.

Figure 14A:
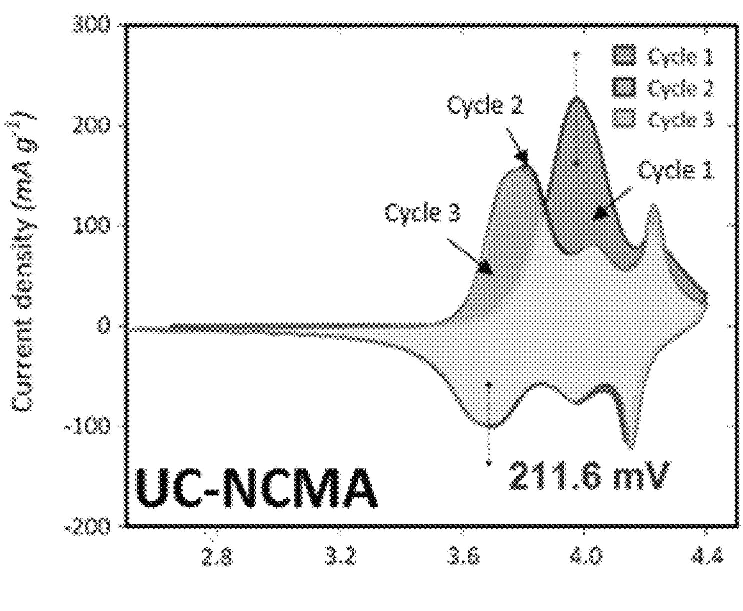
FIG. 14A and FIG. 14B represent cyclic voltammetry curves of the UC-NCMA/Li cells (FIG. 14A) and the CG-NCMA/Li cells (FIG. 14B) (at 0.1 C/0.1 C for 3 cycles in the voltage range of 2.8 to 4.3 V)
Figure 14B:
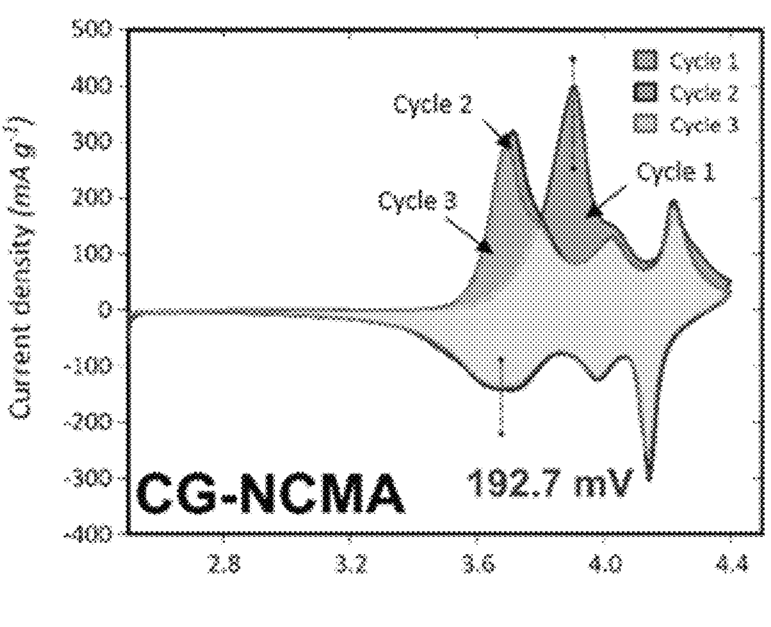

Cyclic voltammetry (CV) is used to analyze the reversibility of electrochemical redox reaction for the cathodes of the LIBs. The results of the first three cycles for the cells with the UC-NCMA oxide cathode and the CG-NCMA oxide cathode are shown in FIG. 14A and FIG. 14B, including a qualitative analysis of the voltages at which electrochemical reactions occurred, accompanying electron transfer in the electrodes. The typical CV curves feature three pairs of redox peaks, representing the transformations of the H1↔M↔H2 phases resulted from the de-intercalation/intercalation of $Li^+$ ions. The delayed dynamic response of the H1-to-M phase transformation in the initial delithiated process results in a slightly higher oxidation voltage. Furthermore, the symmetrical redox peaks in the second and third cycles almost overlap after activation in the first cycle, suggesting the superior electrochemical reversibility of the cathode material.

The voltage polarization is defined as the voltage difference between the first anodic and cathodic peaks near 3.7-4.0 V in the first activation cycle (ΔV), which is a measure of the reversibility of a cathode material. The ΔV values between the first anodic and cathodic peaks (H1⇔M) of the cells with the CG-NCMA oxide cathode and the UC-NCMA oxide cathode are 192.7 mV and 211.6 mV, respectively, wherein the lower voltage polarization in the cell with the CG-NCMA oxide cathode implies that it has greater structural stability and, as a result, possesses good reversible kinetics.

Figure 14C:
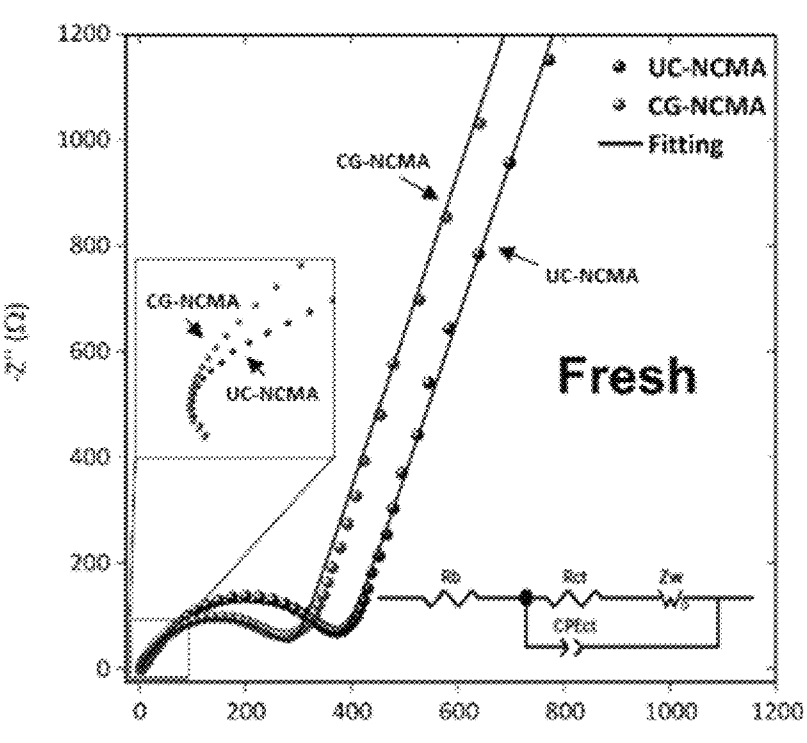
Figures 14D, 15A:
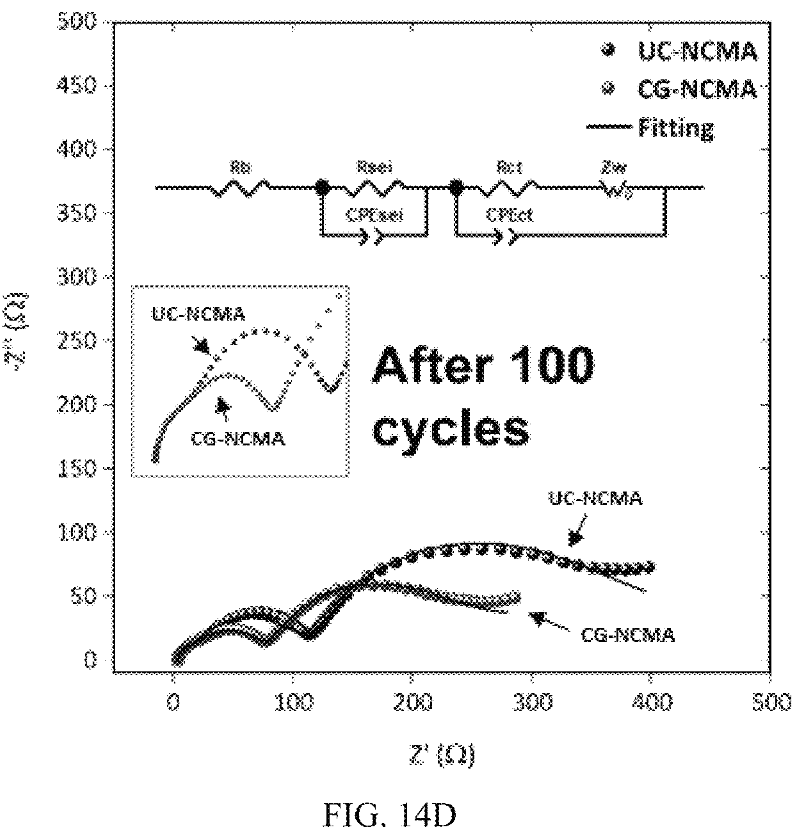

FIG. 14C and FIG. 14D are the initial (i.e., fresh) electrochemical impedance spectroscopy (EIS) spectra and those after 100 cycles at 1 C for the cells containing the UC-NCMA oxide cathode and the CG-NCMA oxide cathode, which feature semicircles at high frequencies (and medium-high frequencies) and straight lines at low frequencies. The EIS curves in the Nyquist plots are fitted based on equivalent circuit models, wherein Rb is the bulk resistance; $R_{sei}$ is the solid electrolyte interphase (SEI) resistance; Ret is the charge transfer resistance; CPE is the constant phase element; and Zw is the Warburg impedance, which characterizes the $Li^+$ ion diffusion impedance in a solid-phased electrode.

After fitting the Nyquist plots for the UC-NCMA oxide cathode and the CG-NCMA oxide cathode at initial state and after 100 cycles to their respective equivalent circuits model by using ZView software, the obtained resistance data are listed in Table 3. The results in Table 3 represent that the initial $R_{ct}$ of the cell with the CG-NCMA oxide cathode is 263.1Ω, much lower than the initial $R_{ct}$ (355.6Ω) of the cell with the UC-NCMA oxide cathode, as shown in FIG. 14C, implying that when the Ni-rich UC-NCMA-based cathode is exposed to the electrolyte, a NiO-like inactive area is easier to be formed on their surfaces, thereby increasing the charge transfer resistance. Furthermore, as shown in FIG. 14D, the both EIS curves for the cells with the UC-NCMA oxide cathode and the CG-NCMA oxide cathode after 100 cycles at 1 C exhibit semicircles, which are then fitted based on the equivalent circuit model (the inset of FIG. 14D). The cell with the CG-NCMA oxide cathode has a lower $R_{ct}$ value after cycling. Moreover, the CG-NCMA-based cell has a $R_{sei}$ value of 66.7Ω, which is lower than that of the UC-NCMA-based cell ($R_{sei}$=95.4Ω). This is consistent with the previous experimental results.

TABLE 3

| Cathode sample | $R_b$(Ω) | $R_{sei}$(Ω) | $R_{ct}$(Ω) |
|---|---|---|---|
| UC-NCMA (initial) | 2.9 | — | 355.6 |
| CG-NCMA (initial) | 2.8 | — | 263.1 |
| UG-NCMA (after 100 cycles) | 9.6 | 95.4 | 417.0 |
| CG-NCMA (after 100 cycles) | 9.6 | 66.7 | 306.1 |

During the long-term cycling, the active secondary particles are prone to be attacked by hydrofluoric fluoride (HF), which may exist in electrolyte, and other residual impurities from unavoidably side reactions. Hence, the Mn-rich outer layer and the Al-rich surface of the CG-NCMA oxide cathode with an element concentration-gradient distribution prepared by the method of the present disclosure can effectively suppress side reactions at the interface between the cathode and the electrolyte and prevent damage to the electrode structure, thereby improving the overall electrochemical performance and cycling stability of the LIBs.

In-Situ XRD Analysis

One of the important roles of the concentration gradient is to maximize the discharge specific capacity by enclosing the Ni-rich phase in the inner layer of the active material particle. Nevertheless, the improvements in the cycling of LIBs and structural stability of electrodes cannot be attributed solely to the concentration gradient, because the CG-NCMA oxide still contains substantial amounts of Ni (a Ni content of 90%). The change in cell volume during charging/discharging cycles may cause huge strain on the structure of the cathode. Furthermore, this strain is anisotropic, because most of the expansion and contraction occur in the c-axis direction. Generally, the anisotropic strain created during $Li^+$ ions de-intercalation (charging) and consequent intercalation (discharging) is regulated by a correlated orientation of the planes formed by a-axis and b-axis.

In-situ XRD method is used to examine lattice parameter changes during a second cycle of charging and discharging, to study the fading mechanism and causes of capacity degradation of the LIBs. FIG. 15A and FIG. 15B represent the XRD patterns during the second charging/discharging cycle of the cells with the UC-NCMA oxide and the CG-NCMA oxide cathodes, respectively. The contour plots in FIG. 15A and FIG. 15B are extracted and compared regarding different peaks, as shown in FIG. 16A and FIG. 16B. During charging, the (003) peak shifts continually to the left (i.e., lattice expanded in the c-axis direction) as $Li^+$ ions are extracted from the cathodes, due to the electrostatic repulsion between adjacent O layers, and then shifts rapidly to higher 2-theta angles at 4.1 V due to the transition from the H2 phase to the H3 phase, indicating the lattice shrinkage, as demonstrated previously in FIG. 13A, FIG. 13B, FIG. 13C, FIG. 13D, FIG. 14A and FIG. 14B.

Furthermore, during charging, the (101) peak shifts to the right as well, implying an a-axis contraction, due to a decrease in the ionic radii in the transition metal layers. During discharging, the same processes are repeated in opposite directions, with all the peaks eventually shifting back to their original Bragg positions at the end of the charge/discharge process, demonstrating the structural reversibility of the NCMA-based cathodes. The other peaks also follow the same shifting tendency, respective of lattice expansion or contraction. Although both cathodes experience the same processes and the same levels of strain, FIG. 16B reveals that the CG-NCMA oxide cathode exhibits much lower degrees of expansion and contraction during cycling, which is potentially beneficial for extending the cycle life of LIBs.

Figure 16C:
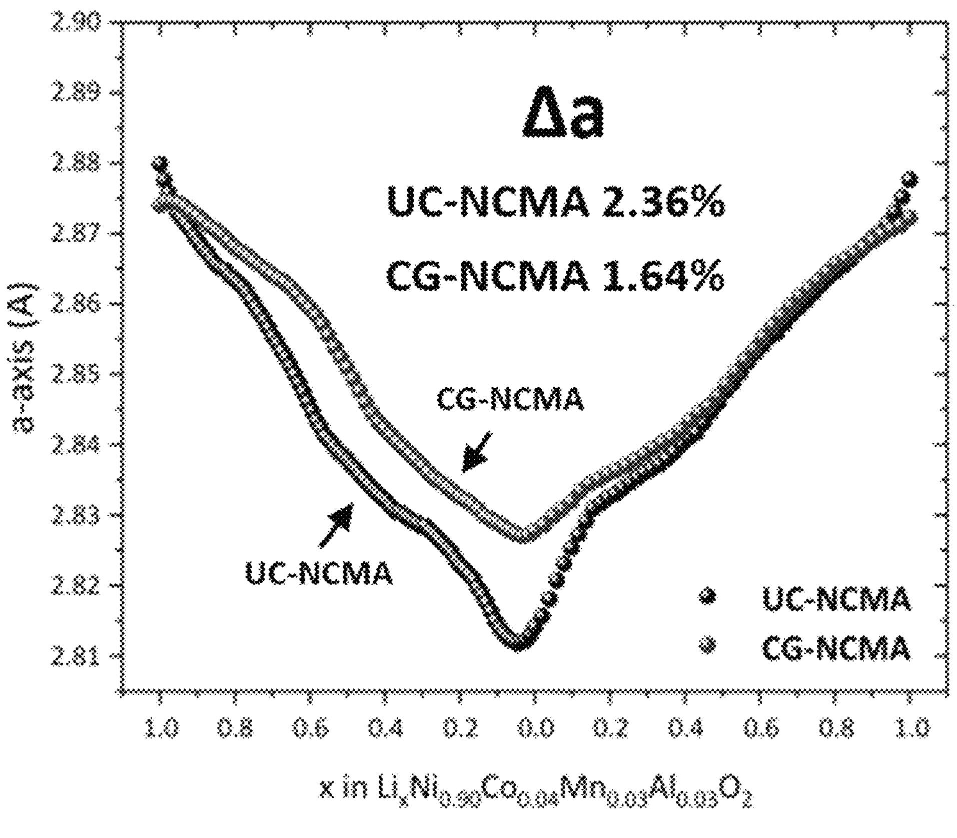
Figure 16D:
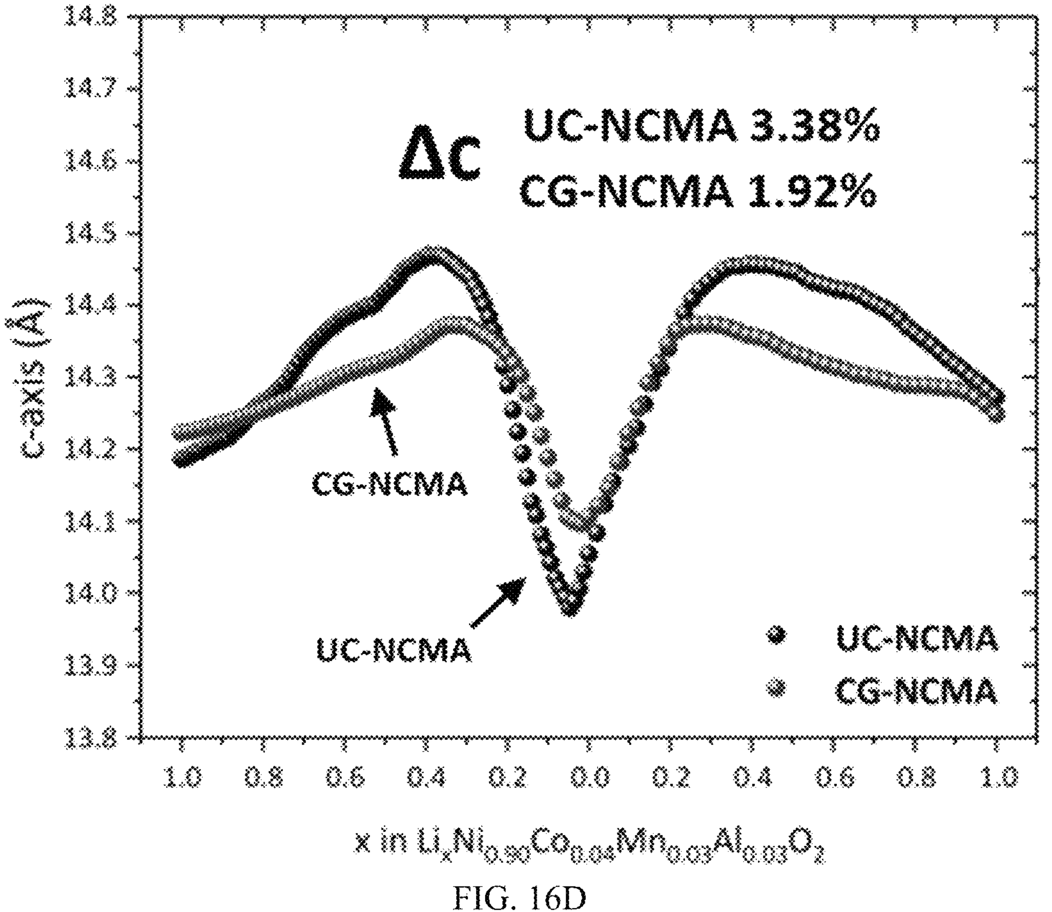
Figure 16E:
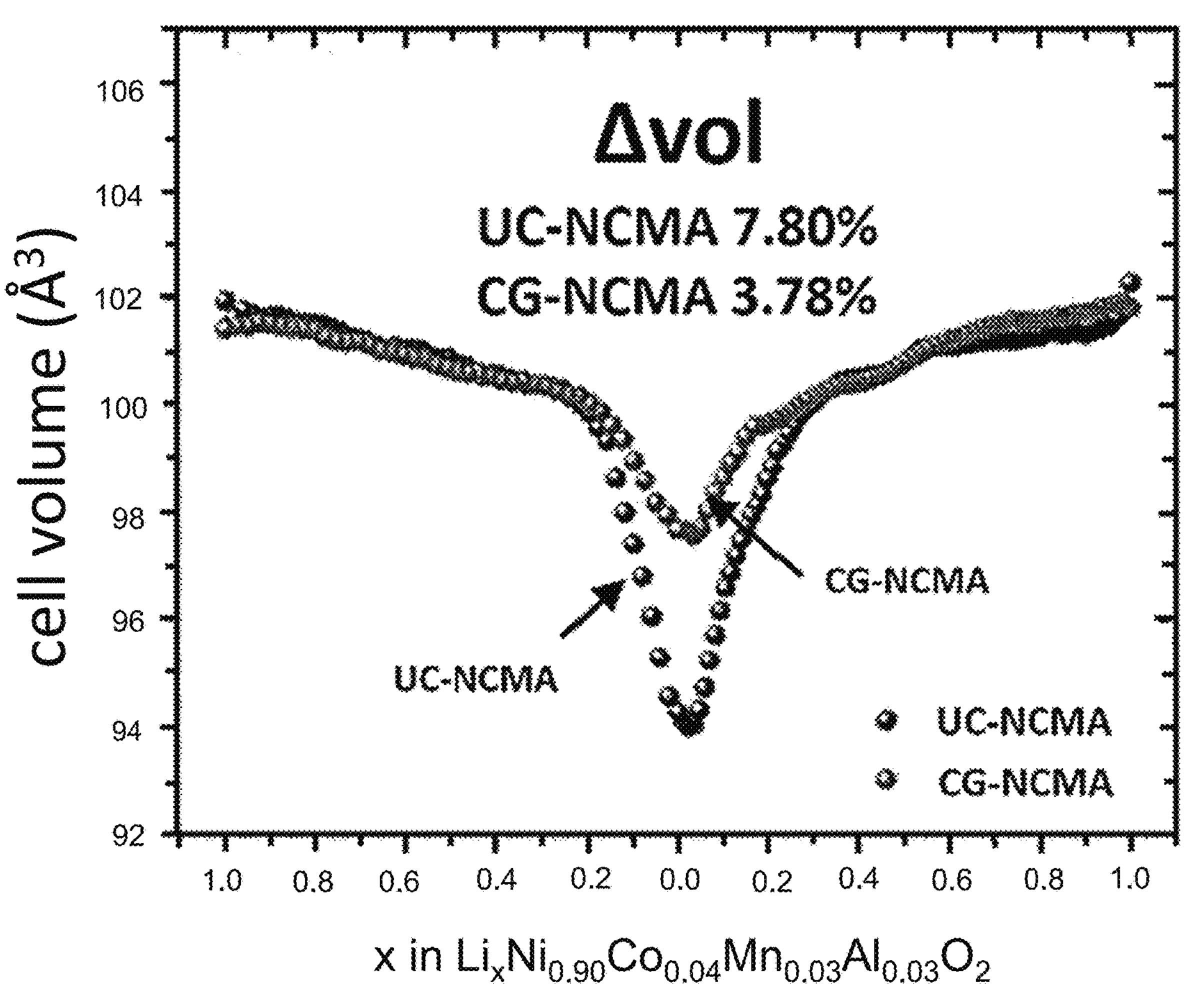

Table 4 and FIG. 16C, FIG. 16D and FIG. 16E present the changes in the lattice parameters during the $Li^+$ ions de/intercalation (i.e., delithiated/lithiated states). It is found that the H2⇔H3 phase transition is the most severe, i.e., the c-axis change (Δc) of the crystal plane (003) for the CG-NCMA oxide cathode is 1.92%, which is much smaller than that for the UC-NCMA oxide cathode (Δc=3.38%). The a-axis change (Aa) of the crystal plane (101) is 1.64% and the lattice volume change (Δvol) is 3.78% for the CG-NCMA oxide cathode, which are much smaller than those of the UC-NCMA oxide cathode (Δa=2.36% and Δvol=7.80%). The changes in these three lattice parameters (i.e., Δa, Δc and Δvol) exhibit the same trend.

TABLE 4

| Cathode sample | UC-NCMA | | | CG-NCMA | | |
|---|---|---|---|---|---|---|
| lattice parameter | Lithiated state | Delithiated state | Δmax (%) | Lithiated state | Delithiated state | Δmax (%) |
| c-axis (Å) | 14.469 | 13.979 | 3.38 | 14.372 | 14.096 | 1.92 |
| a-axis (Å) | 2.879 | 2.811 | 2.36 | 2.874 | 2.87 | 1.64 |
| lattice volume ($Å^3$) | 101.96 | 94.00 | 7.80 | 101.42 | 97.58 | 3.78 |

It may be found in the in-situ XRD analysis above that the unique spatial structure of the primary particles, i.e., the one-dimensional needle-like structure, together with the stronger preferred crystal orientation, of the CG-NCMA oxide cathode may effectively alleviate the volume change of the CG-NCMA oxide cathode when fully charged and enhance its cycle stability. Furthermore, anisotropic contraction/expansion from randomly arranged primary particles may lead to localized concentrations of tensile/compressive stress, eventually initiating microcracks and collapse of material structure. With the CG-NCMA oxide cathode, the Mn-rich outer layer and the Al-rich surface region of the active material particle may suppress the severe volume change of the structure probably caused by charging/discharging, thereby significantly and effectively improving the electrochemical performance and cycling stability of the CG-NCMA cathode material.

Post-Mortem Analysis

To study the effect of the concentration gradient on the structural and mechanical strength of NCMA-based cathodes, NCMA-based/Li half-cells are disassembled after charging/discharging cycles to observe the cycled NCMA-based electrodes through SEM and XRD.

Figure 17A:
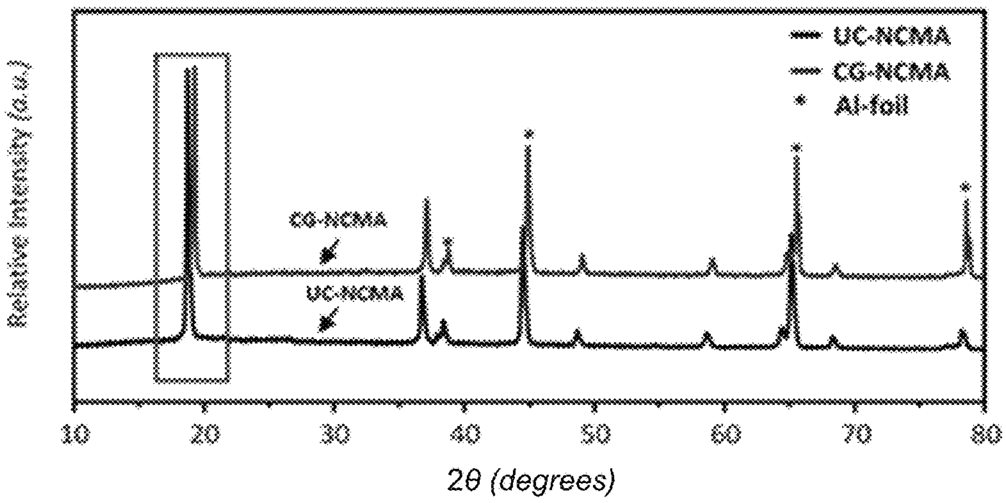
FIG. 17A represents a comparison of XRD patterns of the cells composed of the UC-NCMA cathode and the CG-NCMA cathode at a 1 C/1 C charging/discharging rate after 100 cycles.
Figure 17B:
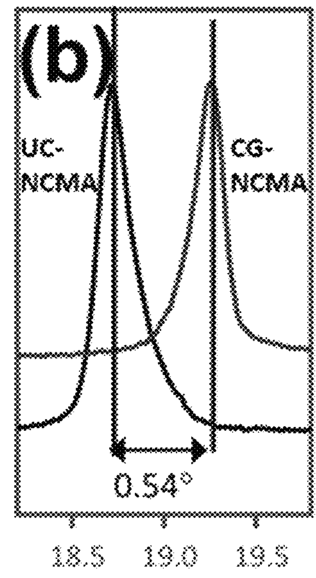
FIG. 17B represents a comparison of the (003) peak shift of the electrodes in the cycled cells composed of the UC-NCMA cathode and the CG-NCMA cathode.

The XRD patterns in FIG. 17A show that the locations, shapes, and relative intensities of the peaks do not exhibit significant difference between the UC-NCMA oxide cathode and the CG-NCMA oxide cathode samples, representing that the capacity fading in LIBs is not merely caused by the structural collapse or an irreversible phase shift in the electrodes. However, as enlarged in the localized XRD patterns of the (003) peaks, as shown in FIG. 17B, compared with the CG-NCMA oxide cathode, the UC-NCMA oxide cathode has a more significant shift of the (003) peak to a lower angle, possessing a shift difference of $\Delta 2\theta = 0.54°$ relative to the (003) peak of the CG-NCMA oxide cathode, suggesting that the prolonged cycling would lead to irreversible damage to the active material particle structure of the UC-NCMA oxide, while the CG-NCMA oxide cathode is able to better withstand the mechanical stress during the extended cycling.

Figure 17C:
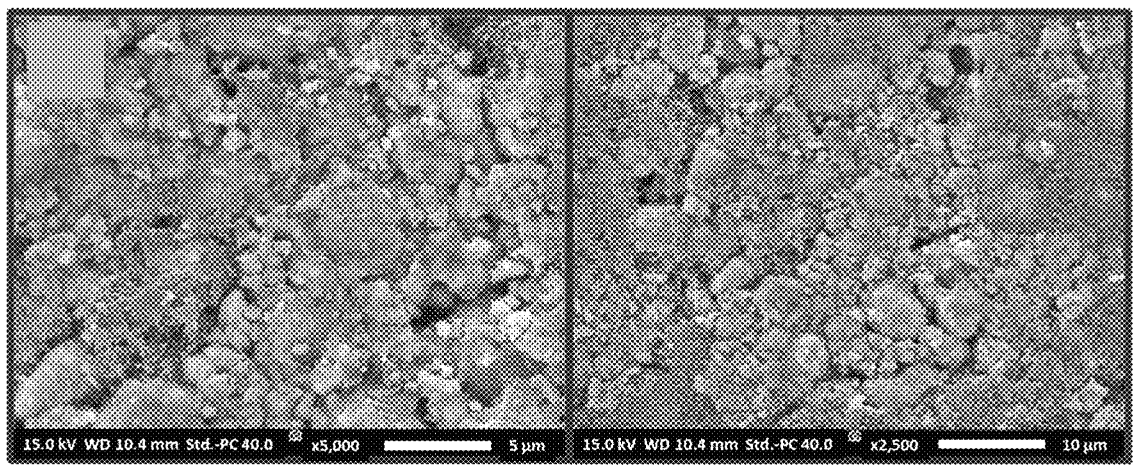
FIG. 17C and FIG. 17D represent a comparison of SEM morphology images of the cycled electrodes of the UC-NCMA cathode (FIG. 17C) and the CG-NCMA cathode (FIG. 17D) at a 1 C/1 C charging/discharging rate after 100 cycles.
Figure 17D:
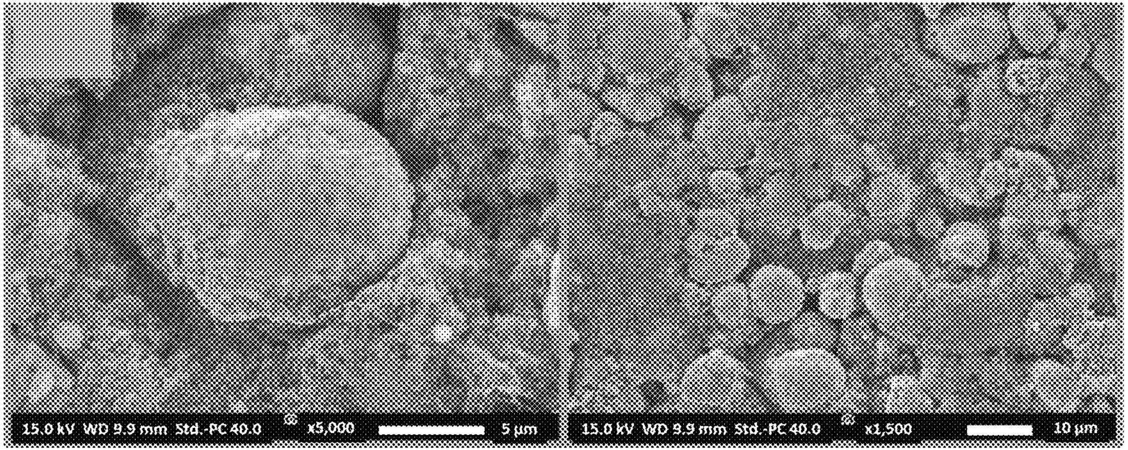

FIG. 17C and FIG. 17D show the SEM images of the UC-NCMA oxide cathode and the CG-NCMA oxide cathode samples after 100 cycles at a 1 C/1 C charging/discharging rate. During the charging/discharging, repeated intercalation and de-intercalation of $Li^+$ ions from the lattices induce a mechanical strain which leads to microcracks along the grain boundaries of the primary particles and disintegrates them from one another. FIG. 17C shows that the secondary particles of the UC-NCMA oxide cathode are completely pulverized into their many primary particles after extended cycling, indicating that their particle structures are not sufficiently strong to withstand long periods of the charging/discharging cycling test. In contrast, FIG. 17D shows that the secondary particles of the CG-NCMA oxide cathode remain intact with only slight microcracks even after 100 cycles at the high charging/discharging rate, suggesting that the CG-NCMA oxide cathode material is sufficiently reinforced to withstand the mechanical stresses induced during prolonged cycling at the high charging/discharging rate. Furthermore, the element distribution of the Mn-rich outer layer and Al-rich surface region of the CG-NCMA oxide cathode also helps the CG-NCMA cathode to stabilize the structure under high voltage (≥4.3 V) and high charging/discharging rates (≥1 C).

Figure 18A:
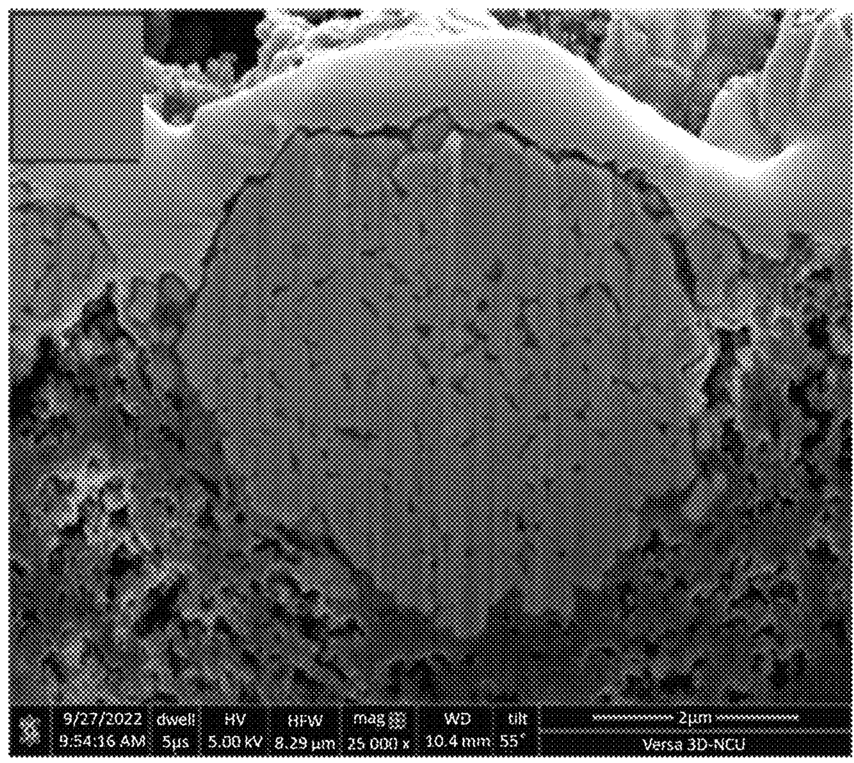
FIG. 18A, FIG. 18B, FIG. 18C, FIG. 18D, FIG. 18E and FIG. 18F represent a comparison of cross-sectional images of the cycled electrodes at a 1 C/1 C charging/discharging rate after 100 cycles, including: SEM micrographic images of the active material particles of the UC-NCMA oxide cathode (FIG. 18A and FIG. 18B) and the active material particles of the CG-NCMA oxide cathode (FIG. 18C and FIG. 18D) at a 1 C/1 C charging/discharging rate after 100 cycles, and TEM micrographic images and the corresponding selected area electron diffraction patterns of the marked regions I and II of the active material particles of the UC-NCMA oxide cathode (FIG. 18E) and the CG-NCMA oxide cathode (FIG. 18F).
Figure 18B:
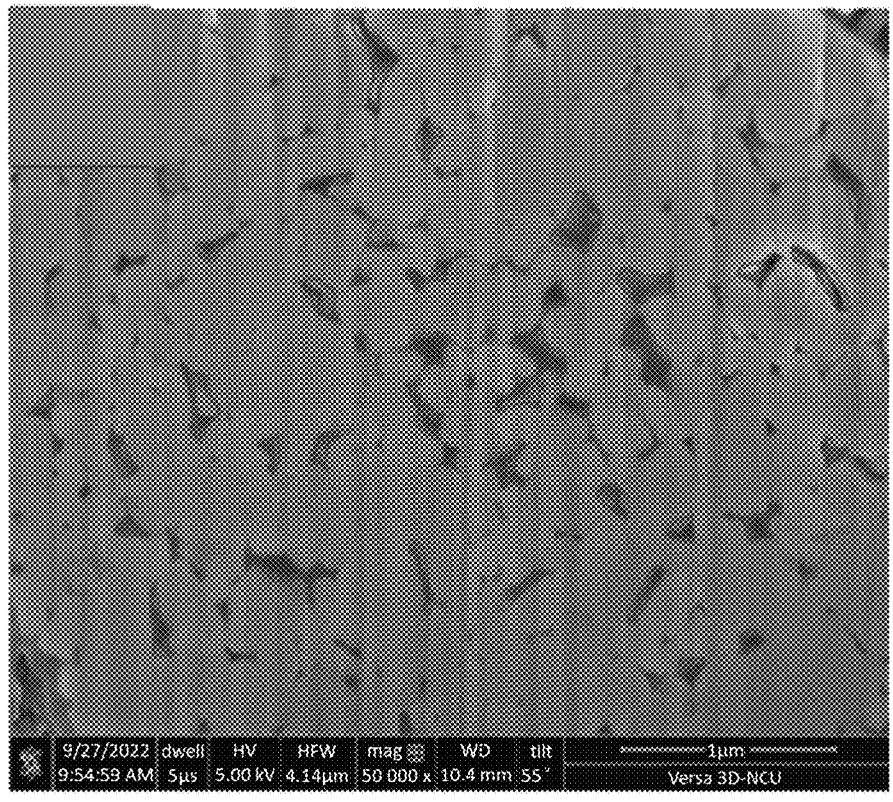
Figure 18C:
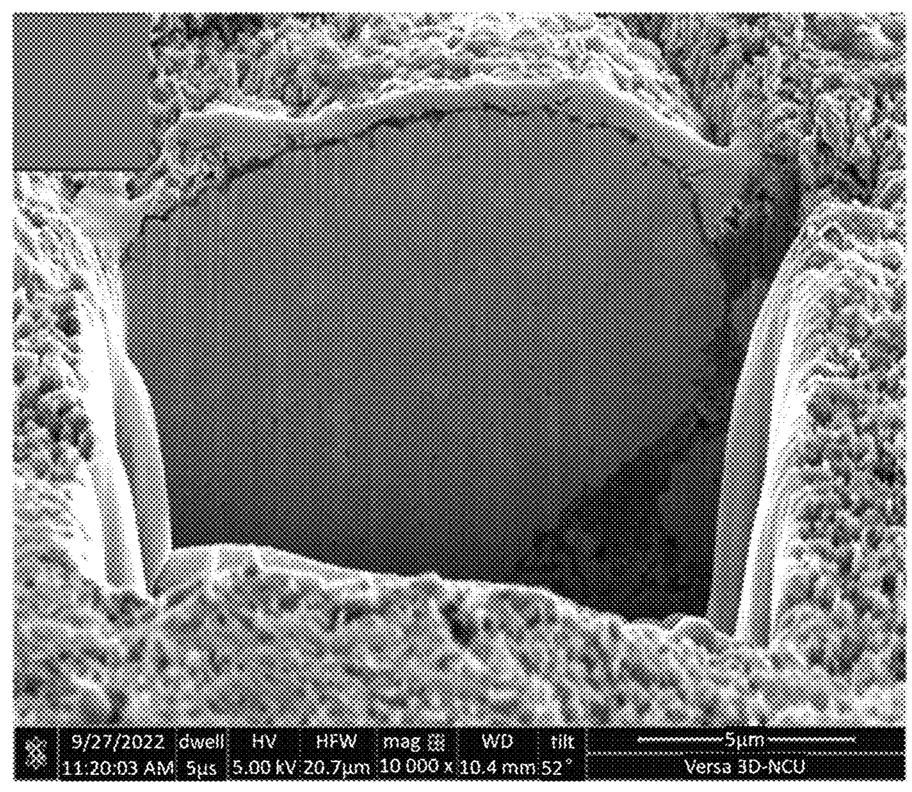
Figure 18D:
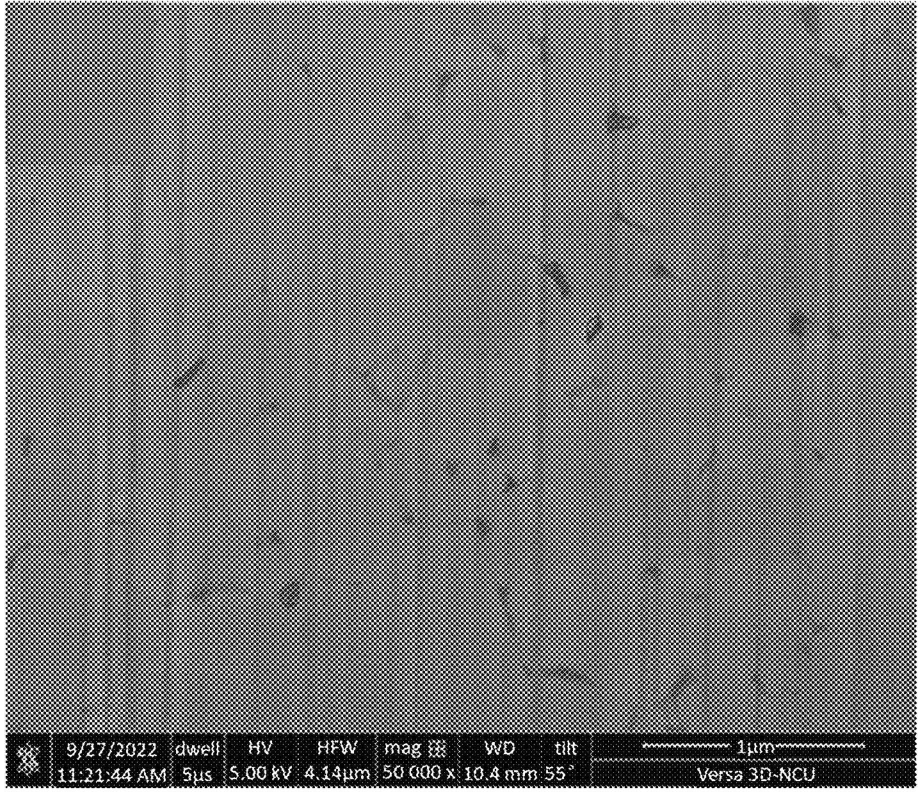

Then, to further study the extent of microcrack formation in inner structure of the secondary particles caused by extended charging/discharging cycling of the LIBs, the secondary particles of the NCMA-based electrode after charging/discharging cycling are dissected using focused ion beam (FIB) technology and the cross-sectional areas of the dissected particles are observed using a SEM. As shown in FIG. 18A and FIG. 18B, the primary particles in the secondary particle of the UC-NCMA oxide cathode sample have obvious microcracks along its grain boundaries. Upon repeated charging/discharging cycling, the primary particles start to detach from one another and cause serious structural damages. In contrast, as shown in FIG. 18C and FIG. 18D, the CG-NCMA oxide cathode sample shows intact arrangement of the primary particles with few microcracks along grain boundaries between the primary particles after repeated charging/discharging cycling.

It is proven by the experimental results of the cross-sectional images dissected by the FIB that the primary particles in the secondary particle of the UC-NCMA oxide cathode tend to generate microcracks along the grain boundaries after prolonged charging/discharging cycling, and the cracks spread out. Moreover, the subsequent electrolyte penetration and reaction hasten the loss of mechanical integrity of the structure. The particle surface sustains severe microstructural damage as the particle surfaces exposed to the electrolyte increase after extended cycling of LIBs. These cause the particles of the UC-NCMA oxide cathode crushed and detached. In contrast, the stable structure of the Mn-rich outer layer and the Al-rich surface region of the CG-NCMA oxide cathode is able to inhibit the development and spread of microcracks, preventing the formation of microcracks and subsequent obliteration of the secondary particles during the prolonged cycling.

Figure 18E:
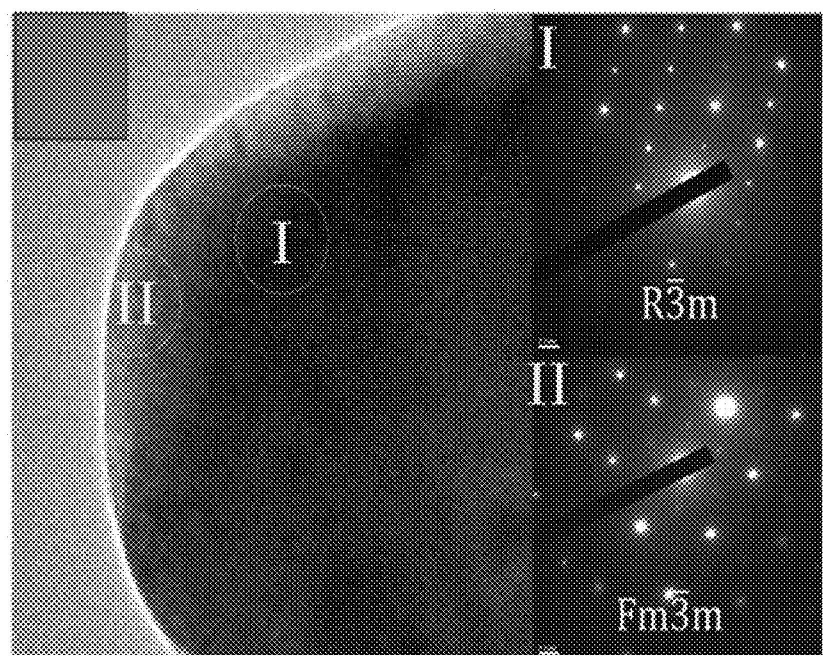
Figure 18F:
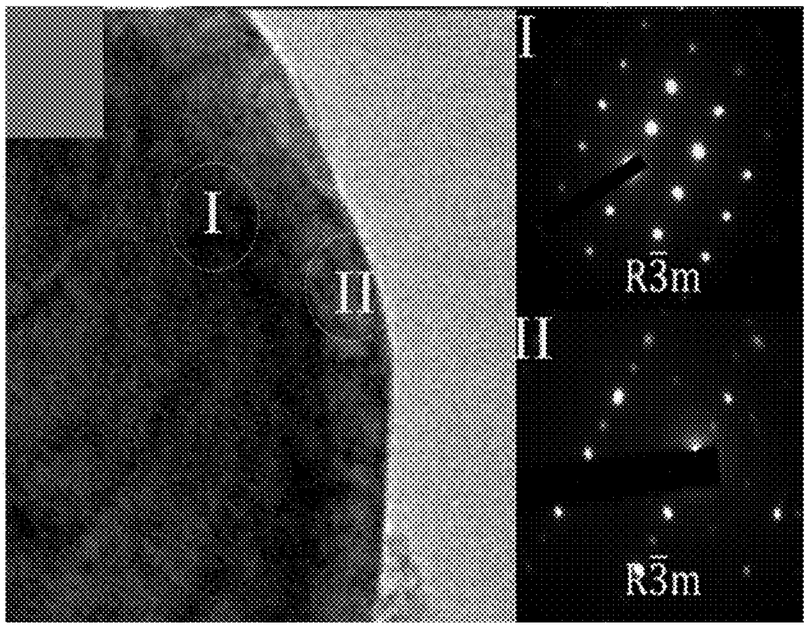

TEM is utilized to examine the extent of phase changes of the surface structure of the active material particles of the UC-NCMA oxide cathode and the CG-NCMA oxide cathode samples after 100 cycles at a high charging/discharging rate of 1 C/1 C. As shown in FIG. 18E, frequent $Li^+$ ion intercalation and de-intercalation result in the obvious phase change of the primary particle of the UC-NCMA oxide cathode after extended charging/discharging cycling. The selected area electron diffraction (SAED) pattern of area I displays the flaw-less R-3m layered structure with alternate layers of transition metals and Li ions. Because of the reactive $Ni^{4+}$ species present at the edge of the particles, which is frequently seen for cycled Ni-rich cathodes, a NiO-like Fm-3m surface layer is detected at area II. On the other hand, as shown in FIG. 18F, the NiO-like damaged layer found in the CG-NCMA oxide cathode is restricted to a slight portion with a width of about 1 nm along the particle edge, making it impossible to be identified using electron diffraction of the selected area I and area II.

In summary, the purpose of the present disclosure is to provide the methods for preparing the nickel-rich hydroxide precursor and oxide cathode materials that can be applied to LIBs. The electrochemical performance of the LIBs and mechanical stability of the prepared cathode materials may be enhanced by the manufacturing methods utilizing a continuous Taylor-flow reactor to prepare the CG-NCM precursor with an element concentration gradient distribution by the co-precipitation reaction under optimized reaction temperature, pH value, heating time and feeding rate, and then further prepare the CG-NCMA oxide with high concentrations of manganese and aluminum elements distributed uniformly on surface thereof. By EDX line scan, the CG-NCMA oxide cathode material is proven to have the homogeneous NCMA quaternary-element structure with an element concentration-gradient distribution, where the Ni concentration decreases gradually upon proceeding toward the outer layer from the inner layer, while the Mn concentration increases gradually upon proceeding toward the outer layer from the inner layer; and Al also uniformly distributes mostly on the surface layer.

The LIB with the CG-NCMA oxide cathode prepared by the present disclosure exhibits excellent electrochemical performances. Specifically, it has an initial discharge specific capacity $Q_{sp,dchg,ini}$ of about 209 mAh/g at a charging/discharging rate of 20 mA/g, and an initial Coulombic efficiency (ICE) of 89.4%, which is higher than that of the cell with the UC-NCMA oxide cathode, 82.9%. The CG-NCMA-based cell has a capacity retention rate ($CR_{1-100}$) of 91.5% after 100 cycles at 1 C, and a capacity retention rate ($CR_{1-200}$) of 80.2% after 200 cycles, which are both much higher than those of the UC-NCMA-based cell ($CR_{1-100}$=83.4% and $CR_{1-200}$=64.1%, respectively).

Furthermore, according to the result of the cyclic voltammetry, and the differential capacity versus voltage analysis, the extent of voltage polarization of the CG-NCMA oxide cathode dramatically decreases. The result of the in-situ X-ray diffractometry analysis demonstrates the mechanical strain bear by the electrode and the impact on the performance of the cells thereof during charging and discharging, wherein the change in strain on the CG-NCMA oxide cathode is relatively lower, thereby reducing the possibility of structural collapse. After extended charging/discharging cycling, the post-mortem analysis of the cycled cathode electrodes using XRD and SEM is performed and also proves the aforementioned results, wherein the secondary particles of the UC-NCMA oxide cathode material have pulverized into many primary particles, while the secondary particles of the CG-NCMA oxide cathode material remain substantially intact.

In summary, the homogeneous structure of element concentration-gradient distribution, i.e., the Ni-rich inner layer and the Mn-rich outer layer, of the nickel-rich hydroxide precursor obtained by the co-precipitation reaction using a continuous Taylor-flow reactor may reduce the interfacial impedance of lithium ions transport and increase their migration paths, and the nickel-rich oxide cathode material prepared from the nickel-rich hydroxide precursor material may enhance the electrochemical performances of the lithium-ion cells such as charging and discharging rate capability and long-term cycling stability, and the structural stability of the nickel-rich cathode material.

The singular forms "a", "an" "the" include plural referents and may be understood as "one or more." Where only one item is intended, the term "one" or other similar language is used. The terms "has," "have," "having," or the like are intended to be open-ended terms.

The Examples described above should be construed as illustrative examples for the present disclosure for the purpose of demonstrating the features of the present disclosure, not intended to be exhaustive or limited to the form of the technical concepts disclosed. Without departing the scope and spirit of the present disclosure, various modification and changes are obvious for a person ordinarily skilled in the art. The embodiments are selected and described for explaining the principle and application for the present disclosure in the best way and allowing a person ordinarily skilled in the art to understand that the invention has various embodiments with various modifications suitable for the particular use contemplated.

What is claimed is:

1. A method for preparing a nickel-rich hydroxide precursor material, which is a nickel cobalt manganese hydroxide having a homogeneous structure with an element concentration-gradient distribution, comprising:

(1) preparing an aqueous solution A with metal ion raw materials dissolved therein;

preparing an aqueous solution B with a manganese source dissolved therein;

preparing an aqueous solution C with a precipitant dissolved therein;

preparing an aqueous solution D with a chelating agent dissolved therein;

feeding the aqueous solution A, the aqueous solution C and the aqueous solution D into a continuous Taylor-flow reactor to perform a first co-precipitation reaction for 2 to 7 hours;

wherein the metal ion raw materials include a nickel source and a cobalt source;

wherein the nickel source is at least one selected from a group consisting of nickel sulfate, nickel oxalate, nickel acetate, nickel nitrate, nickel chloride, and nickel hydroxide;

the cobalt source is at least one selected from a group consisting of cobalt sulfate, cobalt oxalate, cobalt carbonate, cobalt acetate, cobalt nitrate, cobalt chloride, and cobalt hydroxide;

the manganese source is at least one selected from a group consisting of manganese sulfate, manganese oxalate, manganese carbonate, manganese citrate, manganese acetate, manganese nitrate, manganese phosphate, electrolytic manganese dioxide, and manganese oxide;

(2) feeding the aqueous solution B into the continuous Taylor-flow reactor to perform a second co-precipitation reaction for 5 to 70 hours to obtain a precipitate; wherein the second co-precipitation reaction is performed with a reaction temperature of 30° C. to 80° C., an reaction pH value of 9.5 to 12.5, and a rotation speed of an inner cylinder in the continuous Taylor-flow reactor of 200 rpm to 1500 rpm;

(3) washing the precipitate obtained from the second co-precipitation reaction and putting the precipitate into an oven to dry the precipitate, to fabricate the nickel-rich hydroxide precursor material.

2. The method for preparing the nickel-rich hydroxide precursor material of claim 1, wherein the aqueous solution A has a concentration of 1.6 M to 1.92 M.

3. The method for preparing the nickel-rich hydroxide precursor material of claim 1, wherein the aqueous solution B has a concentration of 0.08 M to 0.4 M.

4. The method for preparing the nickel-rich hydroxide precursor material of claim 1, wherein the aqueous solution C has a concentration of 2.0 M to 6.0 M, and a weight molar concentration ratio of the aqueous solution A and aqueous solution C is 1:1 to 1:5.

5. The method for preparing the nickel-rich hydroxide precursor material of claim 1, wherein the aqueous solution D has a concentration of 2.5 M to 9.0 M, and a weight molar concentration ratio of the aqueous solution A and aqueous solution D is 1:1 to 1:5.

6. The method for preparing the nickel-rich hydroxide precursor material of claim 1, wherein the oven is operated with a drying temperature of 60° C. to 120° C. and a drying time of 6 to 24 hours.

7. The method for preparing the nickel-rich hydroxide precursor material of claim 1, wherein the aqueous solution A and the aqueous solution B are fed with a feeding rate of 1.0 to 3.0 ml/min.

8. A method for preparing a nickel-rich oxide cathode material, comprising the method for preparing the nickel-rich hydroxide precursor material of claim 1 and:

(a) dispersing an aluminum source in ethanol, adding and mixing the nickel-rich hydroxide precursor material with the aluminum source in the ethanol to obtain a blend, heating the blend at a temperature of 80° C. until the blend is totally dried to obtain a mixture A;

wherein the aluminum source is at least one selected from a group consisting of aluminum hydroxide, aluminum oxalate, aluminum carbonate, aluminum sulfate, aluminum acetate, aluminum nitrate, and aluminum phosphate;

(b) milling and mixing a lithium source, and a molar ratio of the mixture A and the lithium source is 1:1.01 to 1:1.25 to obtain a mixture B;

the lithium source is at least one selected from a group consisting of lithium hydroxide, lithium nitrate, lithium acetate, lithium chloride, lithium hydrogen phosphate, lithium phosphate, and lithium carbonate;

(c) performing a three-stage calcination to the mixture B to fabricate the nickel-rich oxide cathode material.

9. The method for preparing the nickel-rich oxide cathode material of claim 8, wherein the lithium source and the mixture A are milled with a ball mill for 2 to 10 hours with a rotation speed of the ball milling being 50 to 200 rpm.

10. The method for preparing the nickel-rich oxide cathode material of claim 8, wherein the three-stage calcination is performed at: a temperature of 100° C. to 200° C. for 1 to 3 hours at a first stage; a temperature of 500° C. to 600° C. for 4 to 8 hours at a second stage; and a temperature of 700° C. to 800° C. for 10 to 40 hours at a third stage, wherein the first stage, the second stage and the third stage are performed with a heating rate of 0.1 to 20° C./min.

* * * * *